US012646457B2

(12) United States Patent
Kim et al.

(10) Patent No.: US 12,646,457 B2

(45) Date of Patent: Jun. 2, 2026

(54) DISPLAY DEVICE

(71) Applicant: Samsung Display Co., LTD., Yongin-si (KR)

(72) Inventors: Min Joo Kim, Yongin-si (KR); Min Woo Byun, Yongin-si (KR); Jong Sik Shim, Yongin-si (KR); Dong Hwan Jeon, Yongin-si (KR); Seon I Jeong, Yongin-si (KR); Sung Chan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/796,997

(22) Filed: Aug. 7, 2024

(65) Prior Publication Data

US 2025/0148979 A1 May 8, 2025

(30) Foreign Application Priority Data

Nov. 3, 2023 (KR) ........................ 10-2023-0151098

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2320/0233* (2013.01); *G09G 2330/023* (2013.01)

(58) Field of Classification Search
None
See application file for complete search history.

(56) References Cited

U.S. PATENT DOCUMENTS

2006/0022305 A1* 2/2006 Yamashita ........... G09G 3/2014 257/565
2011/0316833 A1* 12/2011 Chang ...................... G09G 3/20 377/79

(Continued)

FOREIGN PATENT DOCUMENTS

KR 10-0570995 B1 4/2006
KR 10-2020-0076302 A 6/2020

(Continued)

OTHER PUBLICATIONS

European Search Report for EP Application No. 24210412.3 dated Mar. 10, 2025, 14 pages.

*Primary Examiner* — Dorothy Harris

(74) *Attorney, Agent, or Firm* — Womble Bond Dickinson (US) LLP

(57) ABSTRACT

A display device includes: a light emitting element on a substrate; a first transistor configured to control a driving current flowing in the light emitting element; a second transistor configured to supply a data voltage to the gate electrode of the first transistor based on a first gate signal; a third transistor configured to supply a first reference voltage to the gate electrode of the first transistor based on a second gate signal; a fourth transistor configured to supply a second reference voltage different from the first reference voltage to the drain electrode of the first transistor based on a third gate signal; a fifth transistor configured to supply a driving voltage to the drain electrode of the first transistor based on a first emission signal; and a hold capacitor connected between a second reference line supplying the second reference voltage and the source electrode of the first transistor.

20 Claims, 16 Drawing Sheets

(56) References Cited

U.S. PATENT DOCUMENTS

| | | | | |
|---|---|---|---|---|
| 2015/0138180 | A1* | 5/2015 | Park | G09G 3/3233<br>345/212 |
| 2017/0098413 | A1* | 4/2017 | Lee | G09G 3/3233 |
| 2019/0180688 | A1* | 6/2019 | Yang | G09G 3/3258 |
| 2022/0284860 | A1* | 9/2022 | Lin | G09G 3/3266 |
| 2023/0061839 | A1* | 3/2023 | In | G09G 3/3208 |
| 2023/0063644 | A1* | 3/2023 | Chung | G09G 3/3233 |
| 2023/0145644 | A1* | 5/2023 | Shin | G09G 3/3233<br>345/212 |
| 2023/0177999 | A1* | 6/2023 | Park | G09G 3/3233 |
| 2023/0206855 | A1* | 6/2023 | Park | H10K 59/131<br>345/100 |
| 2023/0306906 | A1* | 9/2023 | Yang | G09G 3/3233 |
| 2024/0021165 | A1* | 1/2024 | Kang | G09G 3/3266 |

FOREIGN PATENT DOCUMENTS

| | | | |
|---|---|---|---|
| KR | 10-2241704 | B1 | 4/2021 |
| KR | 10-2021-0095278 | A | 8/2021 |
| KR | 10-2023-0009256 | A | 1/2023 |
| KR | 10-2023-0034842 | A | 3/2023 |

* cited by examiner

ACTL1 : GSE, GACT, GDE
ACTL2 : DE, ACT, SE
GTL1 : GGE
GTL2 : CPE
GTL3 : GE

DISPLAY DEVICE

CROSS-REFERENCE TO RELATED APPLICATION

The present application claims priority to and the benefit of Korean Patent Application No. 10-2023-0151098, filed on Nov. 3, 2023, in the Korean Intellectual Property Office, the entire disclosure of which is incorporated herein by reference.

BACKGROUND

1. Field

Aspects of some embodiments of the present disclosure relate to a display device.

2. Description of the Related Art

As the information-oriented society evolves, consumer demand for display devices is ever increasing. For example, display devices may be employed by or incorporated into a variety of electronic devices such as smart phones, digital cameras, laptop computers, navigation devices, and smart televisions. A light-emitting display device includes a light-emitting element that can emit light on its own, so that each of the pixels of the display panel can emit light by themselves. Accordingly, a light-emitting display device can display images without a backlight unit that supplies light to the display panel.

A display device generally includes a plurality of pixels, data lines and gate lines connected to the plurality of pixels, a data driver supplying data voltages to the data lines, and a gate driver supplying gate signals to the gate lines. The data driver and the gate driver may drive a plurality of pixels according to a frequency (e.g., a set or predetermined frequency).

The above information disclosed in this Background section is only for enhancement of understanding of the background and therefore the information discussed in this Background section does not necessarily constitute prior art.

SUMMARY

Aspects of some embodiments of the present disclosure include a display device capable of preventing or reducing cycle mura or horizontal line defects that may occur during multiple self sections of a frame period.

However, aspects of embodiments of the present disclosure are not restricted to the one set forth herein. The above and other aspects of embodiments of the present disclosure will become more apparent to one of ordinary skill in the art to which the present disclosure pertains by referencing the detailed description of the present disclosure given below.

According to some embodiments, a display device comprises a light emitting element on a substrate, a first transistor controlling a driving current flowing in the light emitting element, a second transistor supplying a data voltage to the gate electrode of the first transistor based on a first gate signal, a third transistor supplying a first reference voltage to the gate electrode of the first transistor based on a second gate signal, a fourth transistor supplying a second reference voltage different from the first reference voltage to the drain electrode of the first transistor based on a third gate signal, a fifth transistor supplying a driving voltage to the drain electrode of the first transistor based on a first emission signal, and a hold capacitor connected between a second reference line supplying the second reference voltage and the source electrode of the first transistor.

According to some embodiments, the display device may further comprise a sixth transistor electrically connecting the source electrode of the first transistor and a first electrode of the light emitting element based on a second emission signal, a seventh transistor discharging the source electrode of the first transistor to a first initialization voltage based on a fourth gate signal, and an eighth transistor discharging the first electrode of the first transistor to a second initialization voltage based on the fourth gate signal.

According to some embodiments, one frame period may be defined as comprising one address section and multiple self sections. According to some embodiments, the third transistor may be turned on by receiving the second gate signal during the first period of the address section and turned off during the multiple self sections. According to some embodiments, the fourth transistor may be turned on by receiving the third gate signal during the second period of the address section and turned off during the multiple self sections.

According to some embodiments, each of the third and fourth transistors may be turned on during the address section in which the fifth transistor and the sixth transistor are turned off.

According to some embodiments, the fifth transistor may be turned on by receiving the first emission signal during the address section and the self section. The sixth transistor may be turned on by receiving the second emission signal during the address section and the self section.

According to some embodiments, the display device may further comprise a sixth transistor electrically connecting the source electrode of the first transistor and the first electrode of the light emitting element based on the first emission signal, a seventh transistor discharging the source electrode of the first transistor to a first initialization voltage based on the fourth gate signal, and an eighth transistor discharging the first electrode of the light emitting element to a second initialization voltage based on the fourth gate signal.

According to some embodiments, one frame period may be defined as comprising one address section and multiple self sections. According to some embodiments, the third transistor may be turned on by receiving the second gate signal during the first period of the address section and turned off during the multiple self sections. According to some embodiments, the fourth transistor may be turned on by receiving the third gate signal during the second period of the address section and turned off during the multiple self sections. According to some embodiments, the fifth and sixth transistors may be turned on by receiving the first emission signal during the address section and the self section.

According to some embodiments, the first transistor may further comprise a bias electrode connected to the source electrode of the first transistor and the hold capacitor.

According to some embodiments, each of the first to fourth transistors may comprise an oxide-based active layer.

According to some embodiments, a display device comprises a light emitting element on a substrate, a first transistor controlling a driving current flowing in the light emitting element, a second transistor supplying a data voltage to the gate electrode of the first transistor based on a first gate signal, a third transistor supplying a first reference voltage to the gate electrode of the first transistor based on a second gate signal, a fourth transistor supplying a driving voltage to the drain electrode of the first transistor based on a third gate signal, a fifth transistor supplying the driving voltage to the drain electrode of the first transistor based on a first emission signal, and a hold capacitor connected between a driving voltage line supplying the driving voltage and the source electrode of the first transistor.

According to some embodiments, the display device may further comprise a sixth transistor electrically connecting the source electrode of the first transistor and the first electrode of the light emitting element based on the first emission signal, a seventh transistor discharging the source electrode of the first transistor to a first initialization voltage based on the fourth gate signal, and an eighth transistor discharging the first electrode of the light emitting element to a second initialization voltage based on the fourth gate signal.

According to some embodiments, one frame period may be defined as comprising one address section and multiple self sections. According to some embodiments, the third transistor may be turned on by receiving the second gate signal during the first period of the address section and turned off during the multiple self sections. According to some embodiments, the fourth transistor may be turned on by receiving the third gate signal during the second period of the address section and turned off during the multiple self sections.

According to some embodiments, the display device may further comprise a sixth transistor electrically connecting the source electrode of the first transistor and a first transistor of the light emitting element based on a second emission signal, a seventh transistor discharging the source electrode of the first transistor to a first initialization voltage based on the fourth gate signal, and an eighth transistor discharging the first electrode of the light emitting element to a second initialization voltage based on the fourth gate signal.

According to some embodiments, the display device may further comprise a sixth transistor electrically connecting the source electrode of the first transistor and the first electrode of the light emitting element based on the first emission signal, a seventh transistor discharging the source electrode of the first transistor to a first initialization voltage based on a fourth gate signal, and an eighth transistor discharging the first electrode of the light emitting element to a second initialization voltage based on a fifth gate signal.

According to some embodiments, one frame period may be defined as comprising one address section and multiple self sections. According to some embodiments, the third transistor may be turned on by receiving the second gate signal during the first period of the address section and turned off during the multiple self sections. According to some embodiments, the fourth transistor may be turned on by receiving the third gate signal during the second period of the address section and turned off during the multiple self sections.

According to some embodiments, the seventh transistor may be turned on by receiving the fourth gate signal during the address section and turned off during the multiple self sections. According to some embodiments, the eighth transistor may be turned on by receiving the fifth gate signal during the address section and the self section.

According to some embodiments, the display device may further comprise a sixth transistor electrically connecting the source electrode of the first transistor and the first electrode of the light emitting element based on a second emission signal, and a seventh transistor discharging the first electrode of the light emitting element to an initialization voltage based on a fourth gate signal.

According to some embodiments, a display device comprises a display area comprising a pixel, and a non-display area comprising a stage supplying a gate signal to the pixel. According to some embodiments, the stage comprises a plurality of gate transistors including a silicon-based active layer to generate the gate signal. According to some embodiments, the pixel comprises a light emitting element on a substrate, a first transistor controlling a driving current flowing in the light emitting element, a second transistor supplying a data voltage to the gate electrode of the first transistor based on a first gate signal, a third transistor supplying a first reference voltage to the gate electrode of the first transistor based on a second gate signal, a fourth transistor supplying a second reference voltage different from the first reference voltage to the drain electrode of the first transistor based on a third gate signal, a fifth transistor supplying a driving voltage to the drain electrode of the first transistor based on a first emission signal, and a hold capacitor connected between a second reference line supplying the second reference voltage and the source electrode of the first transistor. According to some embodiments, the first to fifth transistors include an oxide-based active layer.

According to some embodiments, one frame period may be defined as comprising one address section and multiple self sections. According to some embodiments, the third transistor may be turned on by receiving the second gate signal during the first period of the address section and turned off during the multiple self sections. According to some embodiments, the fourth transistor may be turned on by receiving the third gate signal during the second period of the address section and turned off during the multiple self sections.

According to some embodiments, the second transistor may be turned on by receiving the first gate signal during the third period of the address section and turned off during the multiple self sections.

In the display device according to some embodiments, the drain electrode of a first transistor may receive a compensation voltage in an address section of a frame section and may not receive a compensation voltage in a self section of the frame section, thereby preventing or reducing cycle mura or horizontal line defects.

However, the characteristics of embodiments according to the present disclosure are not limited to the aforementioned characteristics, and various other characteristics are included in embodiments according to the present disclosure.

BRIEF DESCRIPTION OF THE DRAWINGS

The above and other aspects and features of embodiments according to the present disclosure will become more apparent by describing in more detail aspects of some embodiments thereof with reference to the attached drawings, in which.

DETAILED DESCRIPTION

Figure 1:
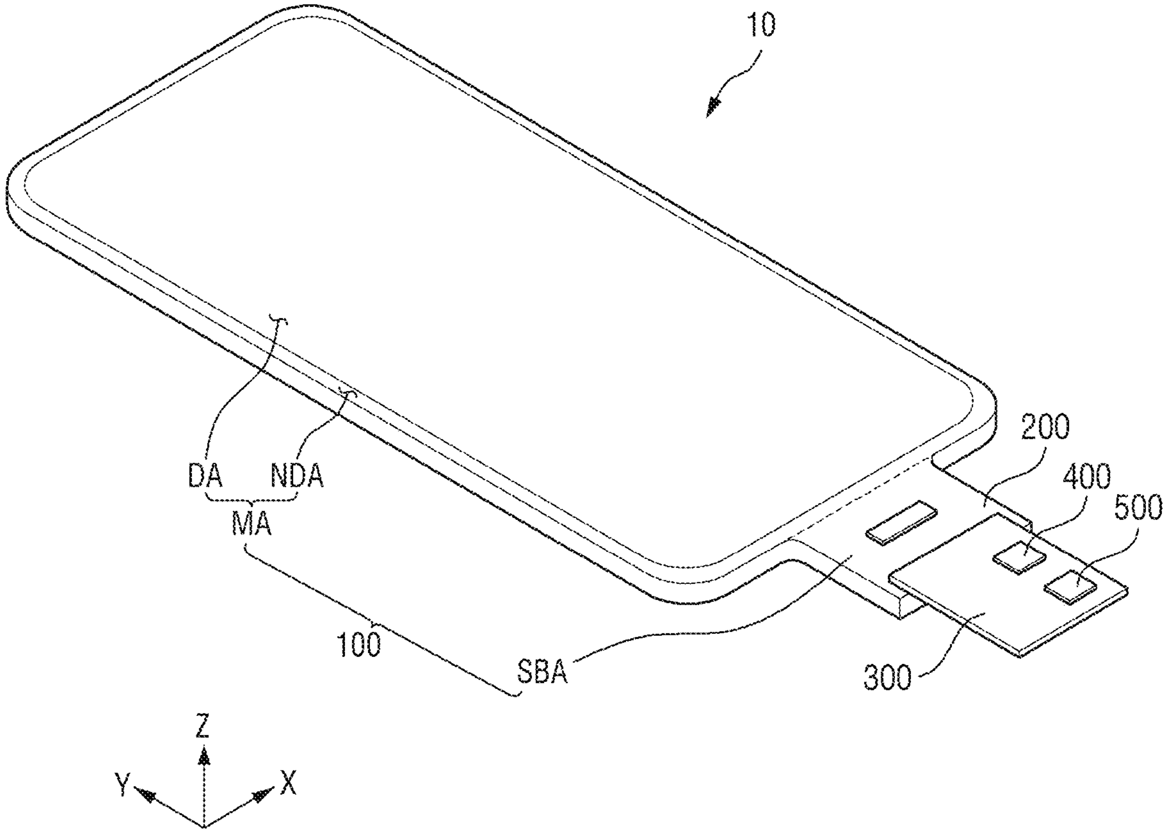
FIG. 1 is a perspective view showing a display device according to some embodiments.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, structures and devices are shown in block diagram form in order to avoid unnecessarily obscuring various embodiments. Further, various embodiments may be different, but do not have to be exclusive nor limit the disclosure. For example, specific shapes, configurations, and characteristics of embodiments according to the present disclosure may be used or implemented in other embodiments without departing from the spirit and scope of embodiments according to the present disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z", "at least one selected from the group consisting of X, Y, and Z", and/or "as least one of X, Y, or Z" may be construed as X only, Y only, Z only, or any combination of two or more of X, Y, and/or Z, such as, for instance, XYZ, XYY, YZ, ZZ, or the like. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, aspects of some embodiments of the disclosure are described with reference to the accompanying drawings.

FIG. 1 is a perspective view showing a display device according to some embodiments.

Referring to FIG. 1, a display device 10 may be applied to or incorporated into portable electronic devices such as mobile phones, smartphones, tablet personal computers, mobile communication terminals, electronic organizers, electronic books, portable multimedia players (PMPs), navigation systems, ultra mobile PCs (UMPCs) or the like. For example, the display device 10 may be applied as a display unit of a television, a laptop, a monitor, a billboard, or an Internet-of-Things (IoT) device. For another example, the display device 10 may be applied to wearable devices such as a smart watch, a watch phone, a glasses type display, or a head mounted display (HMD).

The display device 10 may have a shape similar to a rectangular shape, in a plan view. For example, the display device 10 may have a shape similar to a rectangular shape, in a plan view, having short sides in an X-axis direction and long sides in a Y-axis direction. A corner where the short side in the X-axis direction and long sides in the Y-axis direction meet may be rounded with a curvature (e.g., a set or predetermined curvature) or may be right-angled. The shape of the display device 10 in a plan view is not limited to the rectangular shape, and may be a shape similar to other polygonal shapes, a circular shape, or an elliptical shape.

The display device 10 may include a display panel 100, a display driver 200, a circuit board 300, a touch driver 400, and a power supply unit 500.

The display panel 100 may include a main region MA and a sub-region SBA.

The main region MA may include a display area DA including pixels displaying an image and a non-display area NDA arranged around (e.g., in a periphery or outside a footprint of) the display area DA. The display area DA may emit light from a plurality of emission areas or a plurality of opening areas. For example, the display panel 100 may include a pixel circuit including switching elements, a pixel defining layer defining an emission area or an opening area, and a self-light emitting element.

For example, the self-light emitting element may include one of an organic light emitting diode (LED) including an organic light emitting layer, a quantum dot LED including a quantum dot light emitting layer, an inorganic LED including an inorganic semiconductor, or a micro LED, but is not limited thereto.

The non-display area NDA may be an area outside the display area DA. The non-display area NDA may be defined as an edge area of the main region MA of the display panel 100. The non-display area NDA may include a gate driver that supplies gate signals to the gate lines, and fan-out lines that connect the display driver 200 to the display area DA.

The sub-region SBA may extend from one side of the main region MA. The sub-region SBA may include a flexible material which can be bent, folded or rolled. For example, when the sub-region SBA is bent, the sub-region SBA may overlap the main region MA in a thickness direction (Z-axis direction). The sub-region SBA may include the display driver 200 and a pad connected to the circuit board 300. Alternatively, the sub-region SBA may be omitted, and the display driver 200 and the pads may be located in the non-display area NDA.

The display driver 200 may output signals and voltages for driving the display panel 100. The display driver 200 may supply data voltages to data lines. The display driver 200 may supply a power voltage to a power line and supply gate control signals to the gate driver. The display driver 200 may be formed as an integrated circuit (IC) and be mounted on the display panel 100 in a chip on glass (COG) manner, a chip on plastic (COP) manner, or an ultrasonic bonding manner. As an example, the display driver 200 may be located in the sub-region SBA, and may overlap the main region MA in the thickness direction (Z-axis direction) by bending of the sub-region SBA. As another example, the display driver 200 may be mounted on the circuit board 300.

The circuit board 300 may be attached or mounted onto the pads of the display panel 100 using an anisotropic conductive film (ACF). Lead lines of the circuit board 300 may be electrically connected to the pads of the display panel 100. The circuit board 300 may be a flexible printed circuit board, a printed circuit board, or a flexible film such as a chip on film.

The touch driver 400 may be mounted on the circuit board 300. The touch driver 400 may be connected to a touch sensing unit of the display panel 100. The touch driver 400 may supply touch driving signals to a plurality of touch electrodes of the touch sensing unit and sense change amounts in capacitance between the plurality of touch electrodes. For example, the touch driving signal may be a pulse signal having a frequency (e.g., a set or predetermined frequency). The touch driver 400 may decide or indicate whether or not an input has been generated and calculate input coordinates, based on the change amounts in capacitance between the plurality of touch electrodes. The touch driver 400 may be formed as an integrated circuit (IC).

The power supply unit 500 may be located on the circuit board 300 to supply a power voltage to the display driver 200 and the display panel 100. The power supply unit 500 may generate a driving voltage to supply it to a driving voltage line, and generate a common voltage to supply it to a common electrode which is common to light emitting elements of the plurality of pixels. For example, the driving voltage may be a high potential voltage for driving the light emitting element, and the common voltage may be a low potential voltage for driving the light emitting element. The power supply unit 500 may generate an initialization voltage to supply it to an initialization voltage line, generate a reference voltage to supply it to a reference voltage line, and generate a bias voltage to supply it to a bias voltage line.

Figure 2:
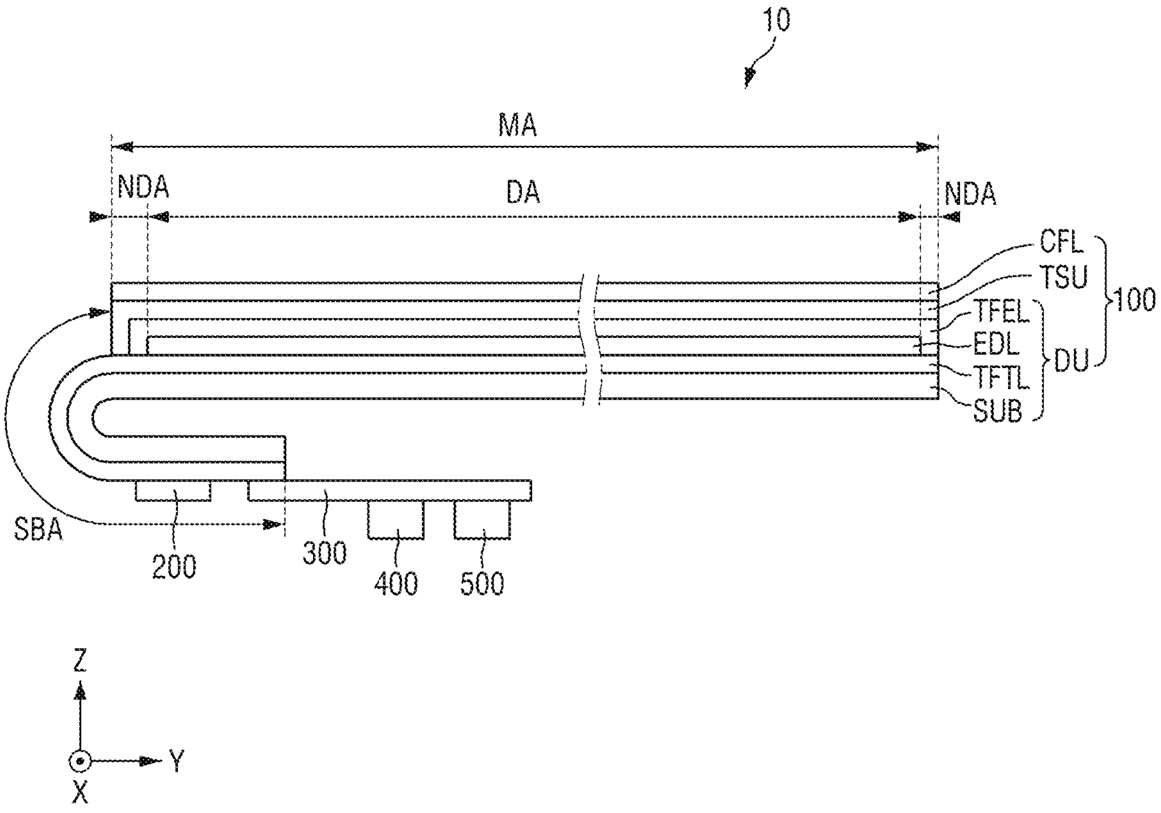
FIG. 2 is a cross-sectional view illustrating a display device according to some embodiments.

FIG. 2 is a cross-sectional view illustrating a display device according to some embodiments.

Referring to FIG. 2, the display panel 100 may include a display unit DU, a touch sensing unit TSU, and a color filter layer CFL. The display unit DU may include a substrate SUB, a thin-film transistor layer TFTL, a light emitting element layer EDL, and an encapsulation layer TFEL.

The substrate SUB may be a base substrate or a base member. The substrate SUB may be a flexible substrate which can be bent, folded or rolled (e.g., without damaging the display device 10). For example, the substrate SUB may include a polymer resin such as polyimide (PI), but embodiments according to the present disclosure are not limited thereto. For another example, the substrate SUB may include a glass material or a metal material.

The thin-film transistor layer TFTL may be located on the substrate SUB. The thin-film transistor layer TFTL may include a plurality of thin-film transistors constituting a pixel circuit of pixels. The thin-film transistor layer TFTL may further include gate lines, data lines, power lines, gate control lines, fan-out lines connecting the display driver 200 and the data lines, and lead lines connecting the display driver 200 to the pad. Each of the thin-film transistors may include a semiconductor region, a source electrode, a drain electrode, and a gate electrode. For example, when the gate driver is formed on one side of the non-display area NDA of the display panel 100, the gate driver may include thin-film transistors.

The thin-film transistor layer TFTL may be located in the display area DA, the non-display area NDA and the sub-region SBA. The thin-film transistors in each of the pixels, the gate lines, the data lines and the power lines in the thin-film transistor layer TFTL may be located in the display area DA. The gate control lines and the fan-out lines in the thin-film transistor layer TFTL may be located in the non-display area NDA. The lead lines of the thin-film transistor layer TFTL may be located in the sub-region SBA.

The light emitting element layer EDL may be located on the thin-film transistor layer TFTL. The light emitting element layer EDL may include a plurality of light emitting elements in each of which a pixel electrode, a light emitting layer and a common electrode are stacked on one another sequentially to emit light, and a pixel defining layer for defining the pixels. The plurality of light emitting elements in the light emitting element layer EDL may be located in the display area DA.

For example, the light emitting layer may be an organic light emitting layer containing an organic material. The light emitting layer may include a hole transporting layer, an organic light emitting layer and an electron transporting layer. When the pixel electrode receives a voltage (e.g., a set or predetermined voltage) and the common electrode receives a cathode voltage through the thin-film transistors in the thin-film transistor layer TFTL, the holes and electrons may move to the organic light emitting layer through the hole transporting layer and the electron transporting layer, respectively, such that they combine in the organic light emitting layer to emit light. For example, the pixel electrode may be an anode electrode while the common electrode may be a cathode electrode.

As another example, the light emitting elements may include quantum-dot light emitting diodes each including a quantum-dot light emitting layer, inorganic light emitting diodes each including an inorganic semiconductor, or micro light emitting diodes.

The encapsulation layer TFEL may cover the upper and side surfaces of the light emitting element layer EDL, and can protect the light emitting element layer EDL. The encapsulation layer TFEL may include at least one inorganic layer and at least one organic layer for encapsulating the light emitting element layer EDL.

The touch sensing unit TSU may be located on the encapsulation layer TFEL. The touch sensing unit TSU may include a plurality of touch electrodes for sensing a user's touch by capacitive sensing, and touch lines connecting the plurality of touch electrodes with the touch driver 400. A plurality of touch electrodes of the touch sensing unit TSU may be located in a touch sensor area overlapping the display area DA. The touch lines of the touch sensing unit TSU may be located in a touch peripheral area overlapping the non-display area NDA. For example, the touch sensing unit TSU may sense a user's touch by mutual capacitance sensing or self-capacitance sensing.

For another example, the touch sensing unit TSU may be located on a separate substrate located on the display unit DU. In such case, the substrate supporting the touch sensing unit TSU may be a base member encapsulating the display unit DU.

The color filter layer CFL may be located on the touch sensing unit TSU. The color filter layer CFL may include a plurality of color filters associated with the plurality of emission areas, respectively. Each of the color filters may selectively transmit light of a particular wavelength and block or absorb lights of other wavelengths. The color filter layer CFL may absorb some of lights introduced from the outside of the display device 10 to reduce the reflection of external light. Accordingly, the color filter layer CFL can prevent or reduce distortion of colors due to the reflection of external light.

Since the color filter layer CFL is located directly on the touch sensing unit TSU, the display device 10 may require no separate substrate for the color filter layer CFL. Therefore, the thickness of the display device 10 can be relatively reduced.

The sub-region SBA of the display panel 100 may be extended from one side of the main region MA. The sub-region SUB may include a flexible material that can be bent, folded, or rolled. For example, when the sub-region SBA is bent, the sub-region SBA may overlap the main region MA in the thickness direction (Z-axis direction). The sub-region SBA may include pads electrically connected to the display driver 200 and the circuit board 300.

Figure 3:
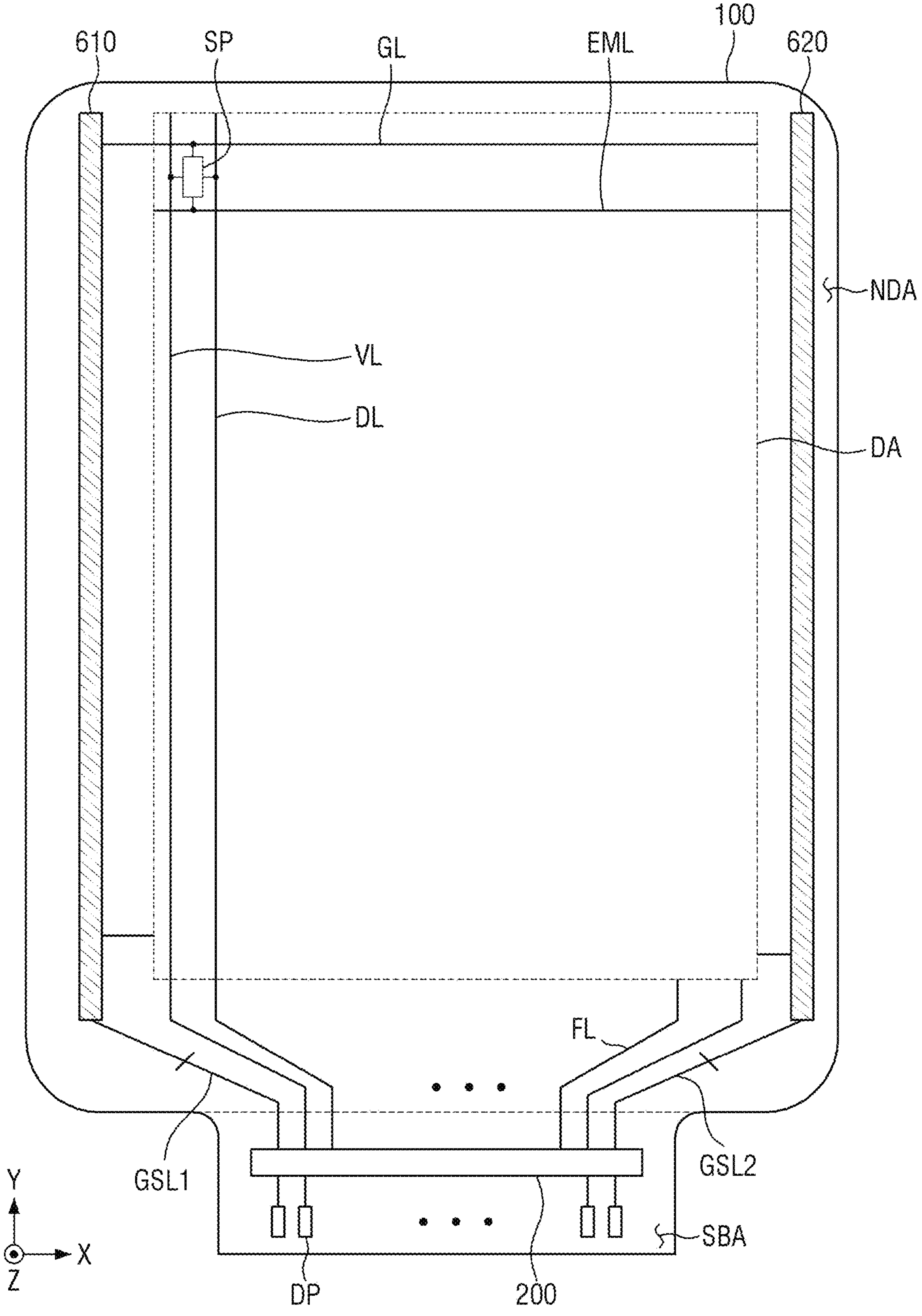
FIG. 3 is a plan view showing a display unit of a display device according to some embodiments.
Figure 4:
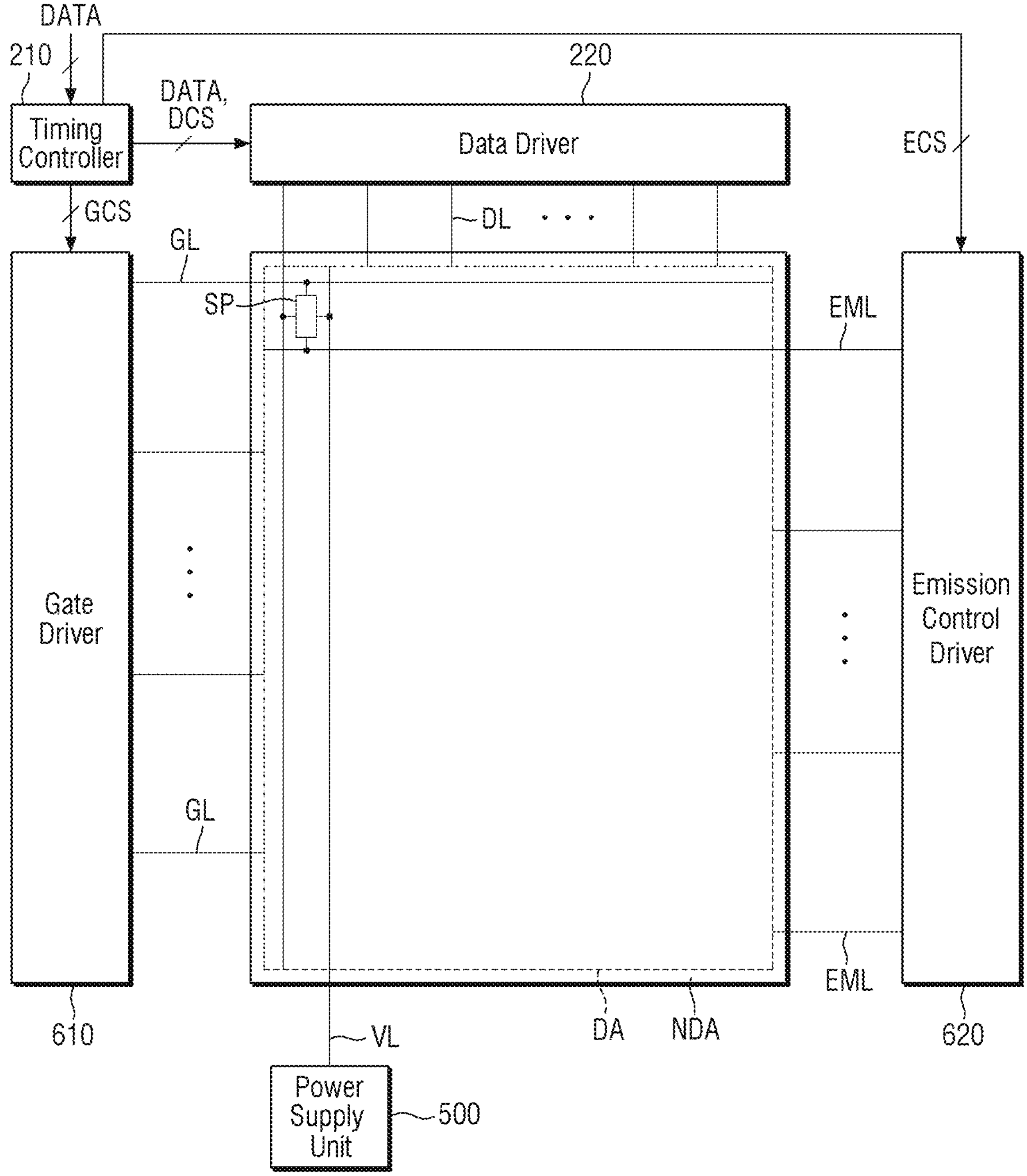
FIG. 4 is a block diagram illustrating a display panel and a display driver according to some embodiments.

FIG. 3 is a plan view showing a display unit of a display device according to some embodiments. FIG. 4 is a block diagram illustrating a display panel and a display driver according to some embodiments.

Referring to FIGS. 3 and 4, the display panel 100 may include the display area DA and the non-display area NDA. The display area DA may include pixels SP, power lines VL, gate lines GL, emission control lines EML, and data lines DL.

Each of the plurality of pixels SP may be connected to a gate line GL, a data line DL, an emission control line EML, and a power line VL. Each of the plurality of pixels SP may include at least one transistor, a light emitting element, and a capacitor.

The gate lines GL may be extended in the X-axis direction and may be spaced apart from one another in the Y-axis direction crossing the x-axis direction. The gate lines GL may sequentially supply gate signals to the plurality of pixels SP.

The emission control lines EML may be extended in the x-axis direction and may be spaced apart from one another in the y-axis direction. The emission control lines EML may sequentially supply emission signals to the plurality of pixels SP.

The data lines DL may be extended in the y-axis direction and may be spaced apart from one another in the x-axis direction. The data lines DL may supply data voltages to the plurality of pixels SP. The data voltage may determine luminance of each of the plurality of pixels SP.

The power lines VL may be extended in the Y-axis direction and may be spaced apart from one another in the X-axis direction. The power lines VL may supply power voltages to the pixels SP. Here, the power voltage may be a driving voltage, a common voltage, an initialization voltage, a reference voltage, a bias voltage or a reset voltage. The driving voltage may be a high potential voltage for driving the light emitting elements and the common voltage may be a low potential voltage for driving the light emitting elements.

The non-display area NDA may surround the display area DA. The non-display area NDA may include a gate driver 610, an emission control driver 620, fan-out lines FL, a first gate control line GSL1 and a second gate control line GSL2.

The fan-out lines FL may be extended from the display driver 200 to the display area DA. The fan-out lines FL may supply the data voltage received from the display driver 200 to the plurality of data lines DL.

The first gate control line GSL1 may be extended from the display driver 200 to the gate driver 610. The first gate control line GSL1 may supply a gate control signal GCS received from the display driver 200 to the gate driver 610.

The second gate control line GSL2 may be extended from the display driver 200 to the emission control driver 620. The second gate control line GSL2 may supply an emission control signal ECS received from the display driver 200 to the emission control driver 620.

The sub-region SBA may be extended from one side of the non-display area NDA. The sub-region SBA may include the display driver 200 and pads DP. The pads DP may be located closer to one edge of the sub-region SBA than the display driver 200. The pads DP may be electrically connected to the circuit board 300 through an anisotropic conductive film ACF.

The display driver 200 may include a timing controller 210 and a data driver 220.

The timing controller 210 may receive digital video data DATA and timing signals from the circuit board 300. The timing controller 210 may generate a data control signal DCS to control the operation timing of the data driver 220, may generate a gate control signal GCS to control the operation timing of the gate driver 610, and may generate an emission control signal ECS to control the operation timing of the emission control driver 620 based on the timing signals. The timing controller 210 may supply the gate control signal GCS to the gate driver 610 through the first gate control line GSL1. The timing controller 210 may supply the emission control signal ECS to the emission control driver 620 through the second gate control line GSL2. The timing controller 210 may supply the digital video data DATA and the data control signal DCS to the data driver 220.

The data driver 220 may convert the digital video data DATA into analog data voltages and may supply them to the data lines DL through the fan-out lines FL. The gate signals from the gate driver 610 may be used to select pixels SP to which a data voltage is applied, and the selected pixels SP may receive the data voltage through the data lines DL.

The power supply unit 500 may be located on the circuit board 300 to supply power voltage to the display drivers 200 and the power line VL of the display panel 100. The power supply unit 500 may generate a driving voltage to supply it to the driving voltage line, and may generate a common voltage to supply it to a common electrode shared by the light emitting elements of a plurality of pixels SP. The power supply unit 500 may generate an initialization voltage to supply it to an initialization voltage line, generate a reference voltage to supply it to a reference voltage line, and generate a bias voltage to supply it to a bias voltage line.

The gate driver 610 may be located on one outer side of the display area DA or on one outer side of the non-display area NDA, and the emission control driver 620 may be located on the opposite outer side of the display area DA or on the opposite outer side of the non-display area NDA. It should be understood, however, that embodiments according to the present disclosure are not limited thereto. For another example, the gate driver 610 and the emission control driver 620 may be located on one side or the other side of the non-display area NDA.

The gate driver 610 may include a plurality of transistors for generating gate signals based on the gate control signal GCS. The emission control driver 620 may include a plurality of transistors for generating emission signals based on the emission control signal ECS. The gate driver 610 may provide gate signals to the gate lines GL, and the emission control driver 620 may provide emission signals to the emission control lines EML.

Figure 5:
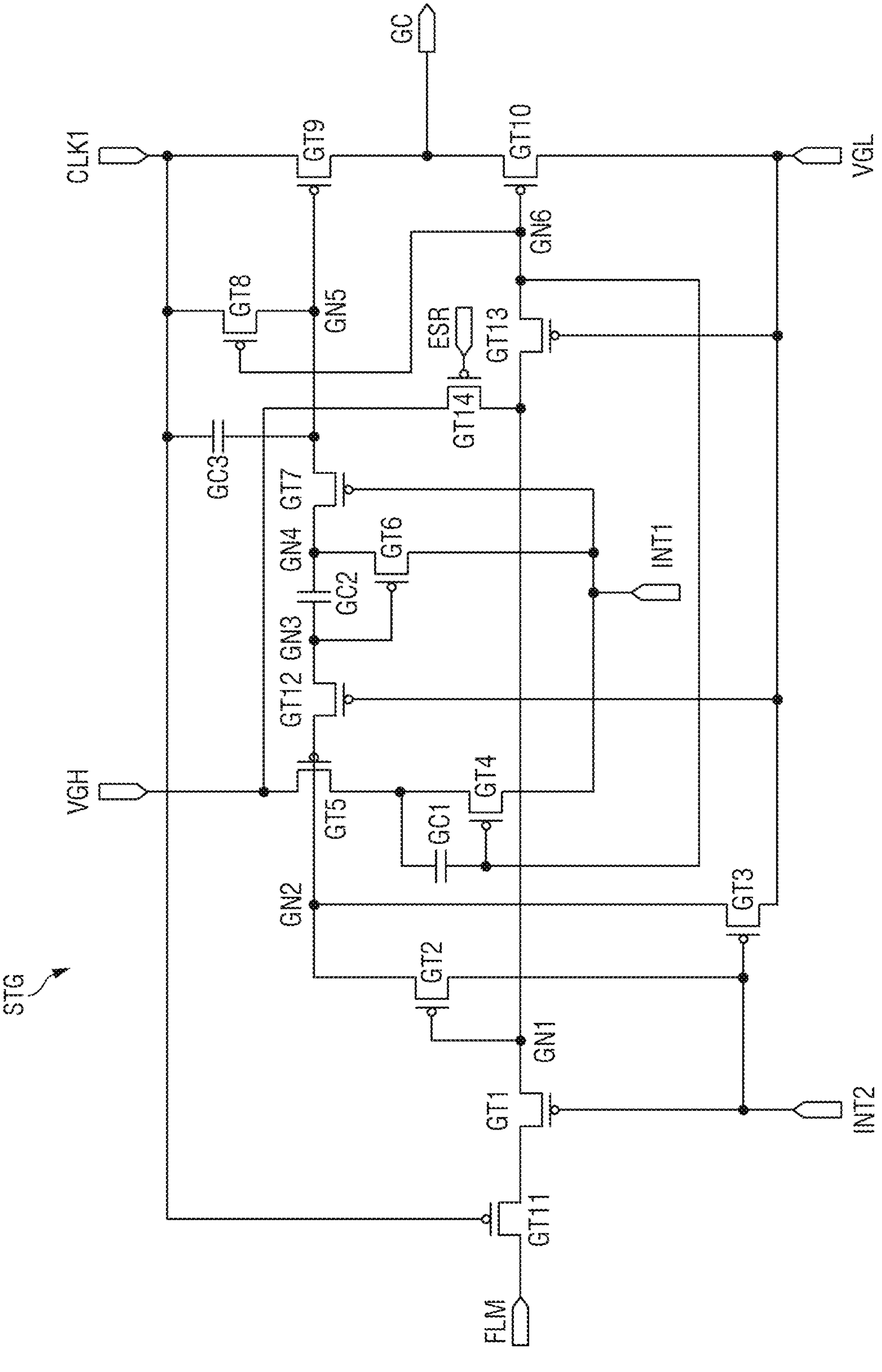
FIG. 5 is a circuit diagram of a stage of a display device according to some embodiments.

FIG. 5 is a circuit diagram of a stage of a display device according to some embodiments.

Referring to FIG. 5, the gate driver 610 may include a plurality of stages STG. The stage STG may receive a gate input signal and output a gate signal. For example, the stage STG may receive at least one of a clock signal, a clock bar signal, a carry clock signal, an input signal, an initialization signal, a gate high voltage, or a gate low voltage and generate a gate signal, but the number and type of the gate input signal is not limited thereto. Each of the stages STG may supply a gate signal to each of the gate lines GL.

The stage STG may include a plurality of gate transistors and a plurality of gate capacitors. The stage STG may include first to fourteenth gate transistors GT1 to GT14 and first to third gate capacitors GC1, GC2, and GC3.

The first gate transistor GT1 may electrically connect the first gate capacitor GT11 and a first stage node GN1 based on a second initialization signal INT2. The gate electrode of the first gate transistor GT1 may receive the second initialization signal INT2, the source electrode of the first gate transistor GT1 may be connected to the drain electrode of the eleventh gate transistor GT11, and the drain electrode of the first gate transistor GT1 may be connected to the first stage node GN1.

The second gate transistor GT2 may electrically connect a second stage node GN2 and the gate electrode of the third gate transistor GT3 based on the voltage of the first stage node GN1. The gate electrode of the second gate transistor GT2 may be connected to the first stage node GN1, the source electrode of the second gate transistor GT2 may be connected to the second stage node GN2, and the drain electrode of the second gate transistor GT2 may be connected to the gate electrode of the third gate transistor GT3.

The third gate transistor GT3 may supply a gate low voltage VGL to the second stage node GN2 based on the second initialization signal INT2. The gate electrode of the third gate transistor GT3 may receive the second initialization signal INT2, the source electrode of the third gate transistor GT3 may receive the gate low voltage VGL, and drain electrode of the third gate transistor GT3 may be connected to the second stage node GN2.

The fourth gate transistor GT4 may supply a first initialization signal INT1 to the drain electrode of the fifth gate transistor GT5 based on a sixth stage node GN6. The gate electrode of the fourth gate transistor GT4 may be connected to the sixth stage node GN6, the source electrode of the fourth gate transistor GT4 may receive the first initialization signal INT1, and drain electrode of the fourth gate transistor GT4 may be connected to the drain electrode of the fifth gate transistor GT5.

The fifth gate transistor GT5 may supply a gate high voltage VGH to the drain electrode of the fourth gate transistor GT4 based on the voltage of the second stage node GN2. The gate electrode of the fifth gate transistor GT5 may be connected to the second stage node GN2, the source electrode of the fifth gate transistor GT5 may receive the gate high voltage VGH, and the drain electrode of the fifth gate transistor GT5 may be connected to the drain electrode of the fourth gate transistor GT4.

The sixth gate transistor GT6 may supply the first initialization signal INT1 to a fourth stage node GN4 based on the voltage of a third stage node GN3. The gate electrode of the sixth gate transistor GT6 may be connected to the third stage node GN3, the source electrode of the sixth gate transistor GT6 may receive the first initialization signal INT1, and the drain electrode of the sixth gate transistor GT6 may be connected to the fourth stage node GN4.

The seventh gate transistor GT7 may electrically connect the fourth stage node GN4 and a fifth stage node GN5 based on the first initialization signal INT1. The gate electrode of the seventh gate transistor GT7 may receive the first initialization signal INT1, the source electrode of the seventh gate transistor GT7 may be connected to the fourth stage node GN4, and the drain electrode of the seventh gate transistor GT7 may be connected to the fifth stage node GN5.

The eighth gate transistor GT8 may supply a first clock signal CLK1 to the fifth stage node GN5 based on the voltage of the sixth stage node GN6. The gate electrode of the eighth gate transistor GT8 may be connected to the sixth stage node GN6, the source electrode of the eighth gate transistor GT8 may receive the first clock signal CLK1, and the drain electrode of the eighth gate transistor GT8 may be connected to the fifth stage node GN5.

The ninth gate transistor GT9 may output the first clock signal CLK1 as a gate signal GC based on the voltage of the fifth stage node GN5. The gate electrode of the ninth gate transistor GT9 may be connected to the fifth stage node GN5, the source electrode of the ninth gate transistor GT9 may receive the first clock signal CLK1, and the drain electrode of the ninth gate transistor GT9 may be connected to an output node. The ninth gate transistor GT9 may be a pull-up transistor of the stage STG, but the present disclosure is not limited thereto.

The tenth gate transistor GT10 may output the gate low voltage VGL as a gate signal GC based on the voltage of the sixth stage node GN6. The gate electrode of the tenth gate transistor GT10 may be connected to the sixth stage node GN6, the source electrode of the tenth gate transistor GT10 may be connected to the output node, and the drain electrode of the tenth gate transistor GT10 may receive the gate low voltage VGL. The tenth gate transistor GT10 may be a pull-down transistor of the stage STG, but embodiments according to the present disclosure are not limited thereto.

The eleventh gate transistor GT11 may supply a first input signal FLM to the first gate transistor GT1 based on the first clock signal CLK1. The gate electrode of the eleventh gate transistor GT11 may receive the first clock signal CLK1, the source electrode of the eleventh gate transistor GT11 may receive the first input signal FLM, and the drain electrode of the eleventh gate transistor GT11 may be connected to the source electrode of the first gate transistor GT1.

The twelfth gate transistor GT12 may electrically connect the second stage node GN2 and a third stage node GN3 based on the gate low voltage VGL. The gate electrode of the twelfth gate transistor GT12 may receive the gate low voltage VGL, the source electrode of the twelfth gate transistor GT12 may be connected to the second stage node GN2, and the drain electrode of the twelfth gate transistor GT12 may be connected to the third stage node GN3.

The thirteenth gate transistor GT13 may electrically connect the first stage node GN1 and the sixth stage node GN6 based on the gate low voltage VGL. The gate electrode of the thirteenth gate transistor GT13 may receive the gate low voltage VGL, the source electrode of the thirteenth gate transistor GT13 may be connected to the first stage node GN1, and the drain electrode of the thirteenth gate transistor GT13 may be connected to the sixth stage node GN6.

The fourteenth gate transistor GT14 may supply the gate high voltage VGH to the first stage node GN1 based on a second input signal ESR. The gate electrode of the fourteenth gate transistor GT14 may receive the second input signal ESR, the source electrode of the fourteenth gate transistor GT14 may receive the gate high voltage VGH, and the drain electrode of the fourteenth gate transistor GT14 may be connected to the first stage node GN1.

Each of the first to fourteenth gate transistors GT1 to GT14 may include a silicon-based active layer. For example, each of the first to fourteenth gate transistors GT1 to GT14 may include an active layer made of low-temperature polycrystalline silicon (LTPS). The active layer made of low-temperature polycrystalline silicon may have a high electron mobility and excellent turn-on characteristics.

Accordingly, by including transistors having excellent turn-on characteristics, the stage STG may be driven stably and efficiently.

Each of the first to fourteenth gate transistors GT1 to GT14 may be a p-type transistor. For example, each of the first to fourteenth gate transistors GT1 to GT14 may output a current flowing into the source electrode to the drain electrode in response to a gate low voltage applied to the gate electrode.

The first gate capacitor GC1 may be connected between the drain electrode of the fourth gate transistor GT4 and the sixth stage node GN6, which is the gate electrode of the fourth gate transistor GT4. Accordingly, the first gate capacitor GC1 can maintain the potential difference between the gate electrode and the drain electrode of the fourth gate transistor GT4.

The second gate capacitor GC2 may be connected between the third stage node GN3, which is the gate electrode of the sixth gate transistor GT6, and the fourth stage node GN4, which is the drain electrode of the sixth gate transistor GT6. Accordingly, the second gate capacitor GC2 can maintain the potential difference between the gate electrode and the drain electrode of the sixth gate transistor GT6.

The third gate capacitor GC3 may be connected between an input terminal of the first clock signal CLK1 and the fifth stage node GN5. Accordingly, the third gate capacitor GC3 can maintain the potential difference between the input terminal of the first clock signal CLK1 and the fifth stage node GN5.

The stage STG may include the first to fourteenth gate transistors GT1 to GT14 and first to third gate capacitors GC1, GC2, and GC3, thereby preventing or reducing instances of the compensation time of a threshold voltage increasing according to a negative shift of the threshold voltage. The stage STG can prevent or reduce instances of the gate signal GC switching from a high level to a low level through a middle level and improve the distribution of the threshold voltage. The gate signal GC outputted from the stage STG may be a third gate signal GC[N] shown in FIGS. 6 and 7.

Figure 6:
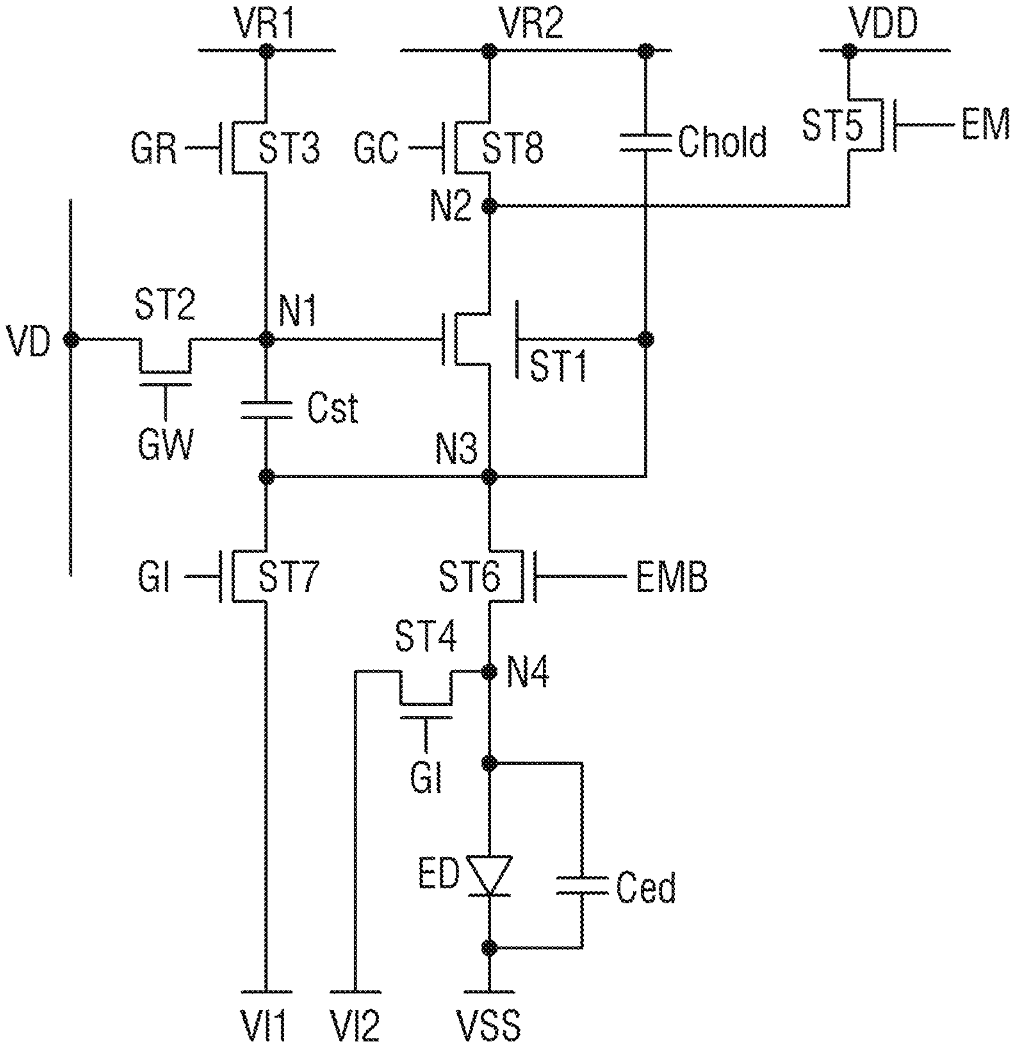
FIG. 6 is a circuit diagram illustrating a pixel of a display device according to some embodiments.
Figure 7:
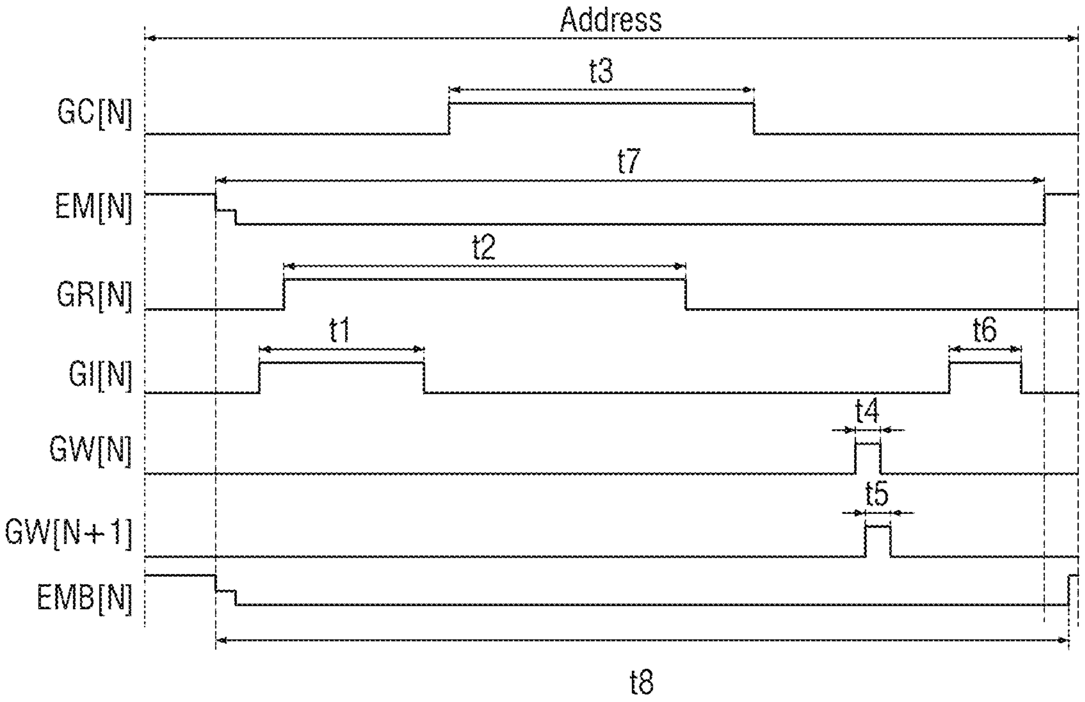
FIG. 7 is a waveform diagram of signals supplied to the pixel shown in FIG. 6.
Figure 7:
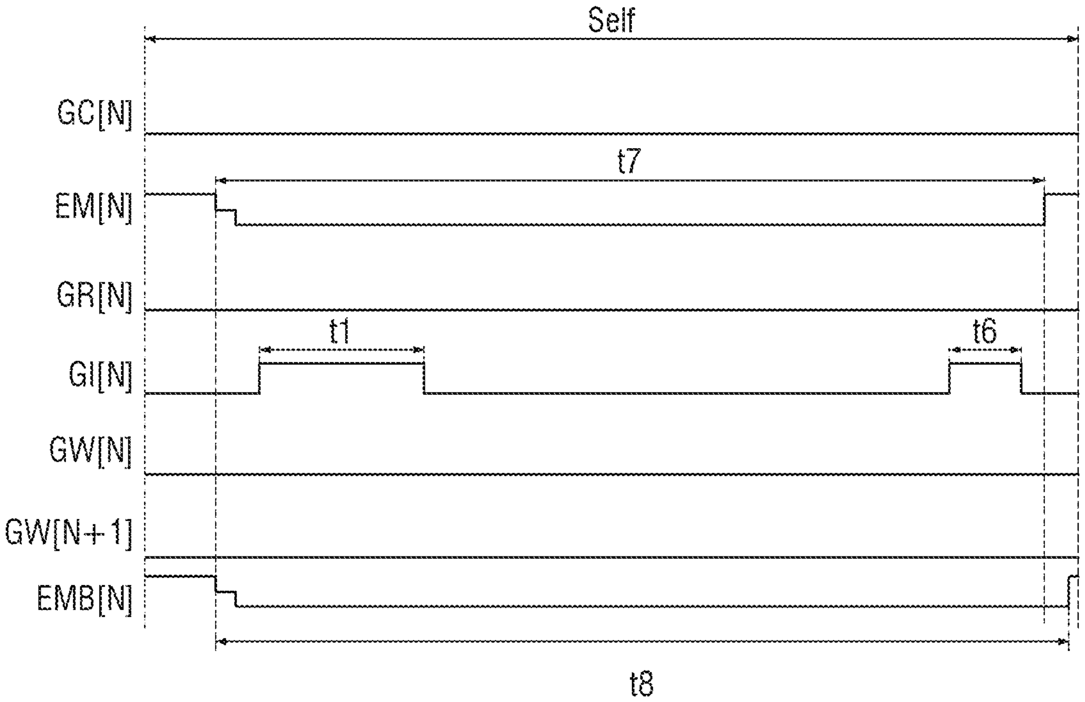

FIG. 6 is a circuit diagram illustrating a pixel of a display device according to some embodiments, and FIG. 7 is a waveform diagram of signals supplied to the pixel shown in FIG. 6.

Referring to FIGS. 6 and 7, the display panel 100 may include a plurality of pixels SP arranged along p rows (p is a positive integer) and q columns (q is a positive integer). Each of the plurality of pixels SP may receive a first gate signal GW, a second gate signal GR, a third gate signal GC, a fourth gate signal GI, a first emission signal EM, a second emission signal EMB, a data voltage VD, a first reference voltage VR1, a second reference voltage VR2, a first initialization voltage VI1, a second initialization voltage VI2, a driving voltage VDD, and a low potential voltage VSS to supply a driving current to a light emitting element ED.

The pixel SP may include a pixel circuit and a light emitting element ED. The pixel circuit may include first to eighth transistors ST1 to ST8, a storage capacitor Cst, a hold capacitor Chold, and a parasitic capacitor Ced.

The first transistor ST1 may include a gate electrode, a drain electrode, and a source electrode. The gate electrode of the first transistor ST1 may be connected to a first node N1, the drain electrode of the first transistor ST1 may be connected to a second node N2, and the source electrode of the first transistor ST1 may be connected to a third node N3. The first transistor ST1 may control a drain-source current Ids (hereinafter, referred to as "driving current") according to the data voltage applied to the gate electrode. The driving current Ids flowing through the channel of the first transistor ST1 may be proportional to the square of a difference between a threshold voltage Vth and a voltage Vgs between the gate electrode and the source electrode of the first transistor ST1 ($Ids=k\times(Vgs-Vth)^2$). Here, k is a proportional coefficient determined by the structure and physical characteristics of the first transistor ST1, Vgs is a gate-source voltage of the first transistor ST1, and Vth is a threshold voltage of the first transistor ST1.

The first transistor ST1 may include a bias electrode. The bias electrode of the first transistor ST1 may overlap the semiconductor region of the first transistor ST1 and be connected to the source electrode of the third node N3. The bias electrode of the first transistor ST1 may stabilize the electric field of the first transistor ST1 and improve output characteristics.

The light emitting element ED may emit light by receiving a driving current Ids. The light emission amount or the luminance of the light emitting element ED may be proportional to the magnitude of the driving current Ids.

The light emitting element ED may be an organic light emitting diode including a first electrode, a second electrode, and an organic light emitting layer located between the first electrode and the second electrode. Here, the first electrode of the light emitting element ED may be a pixel electrode, and the second electrode thereof may be a common electrode. In another example, the light emitting element ED may be an inorganic light emitting element including a first electrode, a second electrode, and an inorganic semiconductor located between the first electrode and the second electrode. In still another example, the light emitting element ED may be a quantum dot light emitting element including a first electrode, a second electrode, and a quantum dot light emitting layer located between the first electrode and the second electrode. In still another example, the light emitting element ED may be a micro light emitting diode.

The first electrode of the light emitting element ED may be connected to a fourth node N4. The first electrode of the light emitting element ED may be connected to the drain electrode of the fourth transistor ST4, and the source electrode of the sixth transistor ST6 via the fourth node N4. The second electrode of the light emitting element ED may receive a low potential voltage VSS.

The second transistor ST2 may be turned on by the first gate signal GW to supply a data voltage VD to the first node N1, which is the gate electrode of the first transistor ST1. The gate electrode of the second transistor ST2 may receive the first gate signal GW, the drain electrode of the second transistor ST2 may receive the data voltage VD, and the source electrode of the second transistor ST2 may be connected to the first node N1. The magnitude of the data voltage VD may vary depending on the gray level of the pixel SP.

The third transistor ST3 may be turned on by the second gate signal GR to supply the first reference voltage VR1 to the first node N1, which is the gate electrode of the first transistor ST1. The gate electrode of the third transistor ST3 may receive the second gate signal GR, the drain electrode of the third transistor ST3 may receive the first reference voltage VR1, and the source electrode of the third transistor ST3 may be connected to the first node N1. The first reference voltage VR1 may be a constant voltage without a ripple.

The fourth transistor ST4 may be turned on by the fourth gate signal GI to discharge the first electrode of the light emitting element ED to a second initialization voltage VI2. The second initialization voltage VI2 may be different from a first initialization voltage VI1. The gate electrode of the fourth transistor ST4 may receive the fourth gate signal GI, the drain electrode of the fourth transistor ST4 may be connected to the fourth node N4 which is the first electrode of the light emitting element ED, and the source electrode of the fourth transistor ST4 may receive the second initialization voltage VI2.

The fifth transistor ST5 may be turned on by the first emission signal EM to supply a driving voltage VDD to the second node N2, which is the drain electrode of the first transistor ST1. The gate electrode of the fifth transistor ST5 may receive the first emission signal EM, the drain electrode of the fifth transistor ST5 may receive the driving voltage VDD, and the source electrode of the fifth transistor ST5 may be connected to the second node N2. The driving voltage VDD may determine the magnitude of the driving current Ids supplied to the light emitting element ED.

The sixth transistor ST6 may be turned on by the second emission signal EMB to electrically connect the third node N3, which is the source electrode of the first transistor ST1 and the fourth node N4, which is the first electrode of the light emitting element ED. The gate electrode of the sixth transistor ST6 may receive the second emission signal EMB, the drain electrode of the sixth transistor ST6 may be connected to the third node N3, and the source electrode of the sixth transistor ST6 may be connected to the fourth node N4.

The seventh transistor ST7 may be turned on by the fourth gate signal GI to discharge the third node N3, which is the source electrode of the first transistor ST1, to the first initialization voltage VI1. The gate electrode of the seventh transistor ST7 may receive the fourth gate signal GI, the drain electrode of the seventh transistor ST7 may be connected to the third node N3, and the source electrode of the seventh transistor ST7 may receive the first initialization voltage VI1.

The eighth transistor ST8 may be turned on by the third gate signal GC to supply the second reference voltage VR2 to the second node N2, which is the drain electrode of the first transistor ST1. The gate electrode of the eighth transistor ST8 may receive the third gate signal GC, the drain electrode of the eighth transistor ST8 may receive the second reference voltage VR2, and the source electrode of the eighth transistor ST8 may be connected to the second node N2. The second reference voltage VR2 may be different from the first reference voltage VR1 and may be a constant voltage without a ripple. The second reference voltage VR2 may be smaller than the driving voltage VDD and greater than the low potential voltage VSS. The second reference voltage VR2 may not be supplied to other transistors and other capacitors except the eighth transistor ST8 and the hold capacitor Chold. The second reference voltage VR2 may be a compensation voltage that compensates for the threshold voltage of the first transistor ST1.

Each of the first to eighth transistors ST1 to ST8 may include an oxide-based active layer. The transistor including the oxide-based active layer may have a coplanar structure in which the gate electrode is located on the oxide-based active layer. The transistor having a coplanar structure may have excellent leakage current characteristics and perform low frequency driving, thereby reducing power consumption. Accordingly, the pixel SP may include the first to eighth transistors ST1 to ST8 having excellent leakage current characteristics, thereby preventing or reducing instances of a leakage current flowing in the pixel SP, and relatively stably maintaining the voltage in the pixel SP.

Each of the first to eighth transistors ST1 to ST8 may correspond to an n-type transistor. For example, each of the first to eighth transistors ST1 to ST8 may output a current flowing into the drain electrode to the source electrode based on a gate high voltage applied to the gate electrode.

The storage capacitor Cst may be electrically connected between the first node N1 and the third node N3. The first capacitor electrode of the storage capacitor Cst may be connected to the first node N1, and the second capacitor electrode of the storage capacitor Cst may be connected to the third node N3. Accordingly, the storage capacitor Cst can maintain the potential difference between the gate electrode and the source electrode of the first transistor ST1.

The hold capacitor Chold may be electrically connected between a second reference line supplying a second reference voltage VI2 and the third node N3. The first capacitor electrode of the hold capacitor Chold may receive the second reference voltage VI2, and the second capacitor electrode of the hold capacitor Chold may be connected to the third node N3. Accordingly, the hold capacitor Chold can maintain the potential difference between the second reference voltage VI2 and the source electrode of the first transistor ST1.

The parasitic capacitor Ced may be connected between the first electrode and the second electrode of the light emitting element ED. Accordingly, the parasitic capacitor Ced can maintain the potential difference between the first electrode and the second electrode of the light emitting element ED.

Referring to FIG. 7 in conjunction with FIG. 6, in the case where the display device 10 is driven at a driving frequency (e.g., a set or predetermined driving frequency), one frame period may include one address section and multiple self sections. The address section may receive signals during the first to eighth periods t1 to t8, and the self section may receive signals during the first period t1, and sixth to eighth periods t6 to t8.

The fourth and seventh transistors ST4 and ST7 of the pixel SP arranged in the $N^{th}$ row may receive a high level fourth gate signal GI[N] during the first period t1 and the sixth period t6 of the address section and the first period t1 and the sixth period t6 of the self section. The fourth transistor ST4 may be turned on based on the high level fourth gate signal GI[N] and may discharge the first electrode of the light emitting element ED to the second initialization voltage VI2. The seventh transistor ST7 may be turned on based on the high level fourth gate signal GI[N], and the source electrode of the first transistor ST1 may be discharged to the first initialization voltage VI1.

The third transistor ST3 may receive a high level second gate signal GR[N] during the second period t2 of the address section. The third transistor ST3 may be turned on based on the high level second gate signal GR[N], and the first reference voltage VR1 may be connected to the first node N1, which is the gate electrode of the first transistor ST1. The third transistor ST3 may be turned off during the self section. Accordingly, the third transistor ST3 may be turned on once during one frame period to supply the first reference voltage VR1 to the gate electrode of the first transistor ST1.

The eighth transistor ST8 may receive the high level third gate signal GC[N] during the third period t3 of the address section. The eighth transistor ST8 may be turned on based on the high level third gate signal GC[N], and the second reference voltage VR2 may be supplied to the second node N2, which is the drain electrode of the first transistor ST1. The eighth transistor ST8 may be turned off during the self section. Accordingly, the eighth transistor ST8 may be turned on once during one frame period to supply the second reference voltage VR2 to the drain electrode of the first transistor ST1. The eighth transistor ST8 is turned off during the self section, thereby preventing or reducing cycle mura or horizontal line defects that may occur during the self section.

The third gate signal GC[N] may be received from the stage STG of FIG. 5. Accordingly, the third gate signal GC[N] may be converted from the high level to the low level without passing through the middle level, and the eighth transistor ST8 may be turned on during the third period t3 to improve distribution of the threshold voltage.

The second transistor ST2 may receive a high level first gate signal GW [N] during the fourth period t4 of the address section. The second transistor ST2 may be turned on based on the high-level first gate signal GW [N], and the data voltage VD may be supplied to the first node N1, which is the gate electrode of the first transistor ST1. The second transistor ST2 may be turned off during the self section. The second transistor ST2 of the pixel SP arranged in the $(N+1)^{th}$ row may receive a high level first gate signal GW [N+1] during the fifth period t5 of the address section.

When the gate electrode of the first transistor ST1 receives the data voltage VD during the fourth period t4 of the address section, a gate-source voltage Vgs of the first transistor ST1 may correspond to a difference voltage VD-VI1 between the data voltage VD and the first initialization voltage VI1, and the first transistor ST1 may be turned on because the gate-source voltage Vgs of the first transistor ST1 is greater than the threshold voltage (hereinafter, denoted by "Vth") (VD−VI1>=Vth). Accordingly, at the moment when the second transistor ST2 is turned on in the fourth period t4, the drain-source current Ids of the first transistor ST1 may be determined according to the data voltage VD, the first initialization voltage VI1, and the threshold voltage Vth of the first transistor ST1 ($Ids=k\times(VD-VI1-Vth)^2$). The first transistor ST1 may supply the drain-source current Ids to the third node N3 until the gate-source voltage Vgs reaches the threshold voltage Vth of the first transistor ST1. In this manner, while the first transistor ST1 is turned on, the voltage of the third node N3 and the drain-source current Ids of the first transistor ST1 may be changed, and the voltage of the third node N3 may eventually converge to a difference voltage VD-Vth between the data voltage VD and the threshold voltage Vth of the first transistor ST1.

The fifth transistor ST5 may receive a low level first emission signal EM[N] during the seventh period t7 of each of the address section and self section. The fifth transistor ST5 may be turned on based on the high level first emission signal EM[N] except for the seventh period t7, and the driving voltage VDD may be supplied to the second node N2, which is the drain electrode of the first transistor ST1. After the seventh period t7, the fifth transistor ST5 may be turned on before the sixth transistor ST6.

The sixth transistor ST6 may receive a low level second emission signal EMB[N] during the eighth period t8 of each of the address section and self section. The sixth transistor ST6 may be turned on based on the high level second emission signal EMB[N] except for the eighth period t8, and may electrically connect the third node N3 and the fourth node N4. Since the sixth transistor ST6 is turned on later than the fifth transistor ST5, the third node N3 and the fourth node N4 may be electrically connected after the voltage of the third node N3 increases, and the light emitting element ED can be driven efficiently.

The first emission signal EM[N] may be converted from the high level to the low level through the middle level at the time of the seventh period t7, and the second emission signal EMB[N] may be converted from the high level to the low level through the middle level at the time of the eighth period t8. The display device 10 may include the hold capacitor Chold connected between the second reference line of the second reference voltage VI2 and the source electrode of the first transistor ST1, thereby reducing errors due to voltage changes in the first emission signal EM[N] during the sensing process of the threshold voltage of the first transistor ST1 and preventing or reducing cycle mura or horizontal line defects that may occur during the self section.

Figure 8:
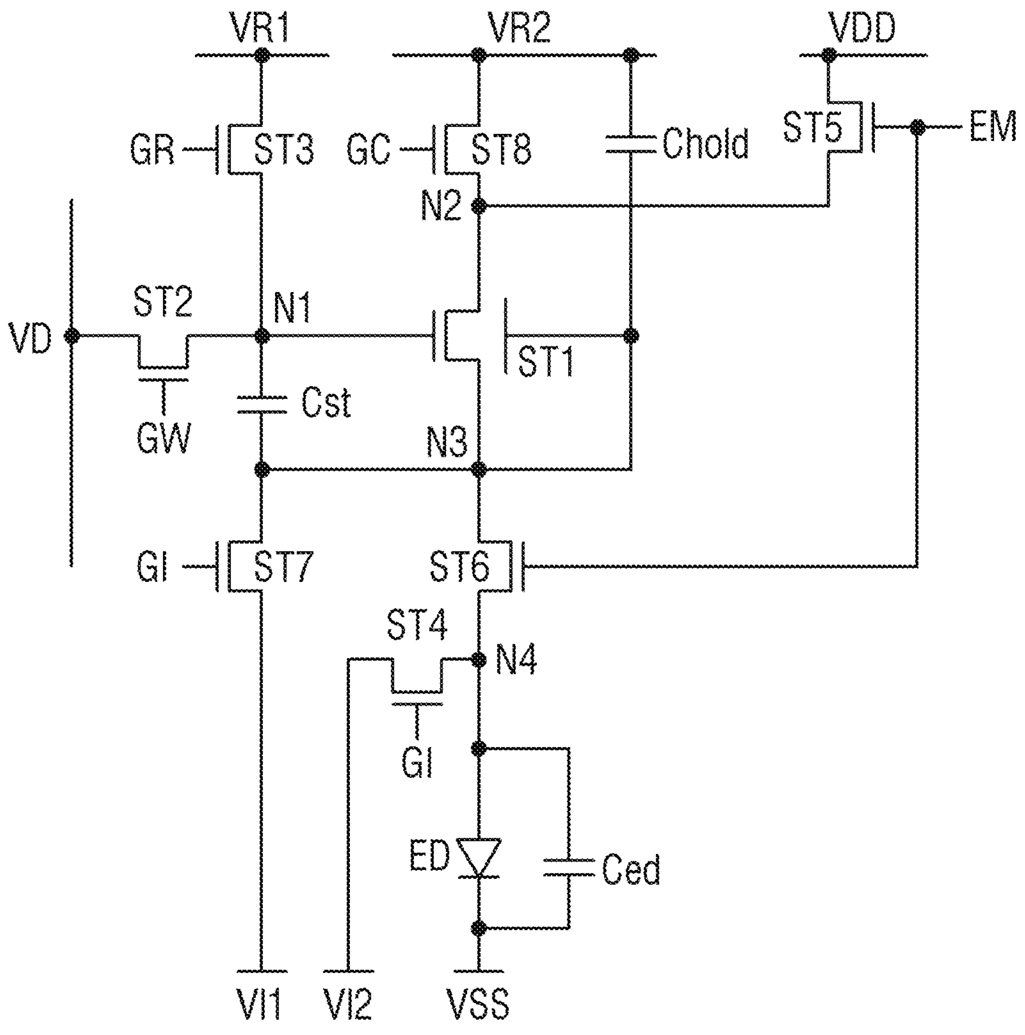
FIG. 8 is a circuit diagram illustrating a pixel of a display device according to some embodiments.
Figure 9:
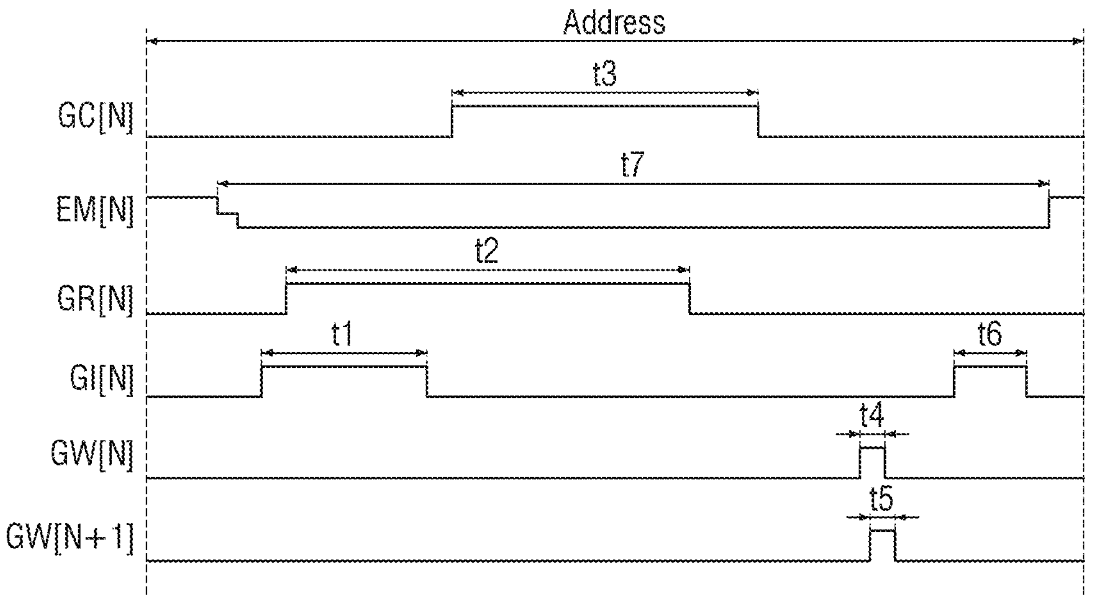
FIG. 9 is a waveform diagram of signals supplied to the pixel shown in FIG. 8.
Figure 9:

FIG. 8 is a circuit diagram showing a pixel of a display device according to some embodiments, and FIG. 9 is a waveform diagram of signals supplied to the pixel shown in FIG. 8. The display devices of FIGS. 8 and 9 replace the second emission signal EMB in the display devices of FIGS. 6 and 7 with the first emission signal EM, and the same configuration as the configuration described above will be briefly explained or omitted.

Referring to FIGS. 8 and 9, each of the plurality of pixels SP may receive a first gate signal GW, a second gate signal GR, a third gate signal GC, a fourth gate signal GI, a first emission signal EM, a data voltage VD, a first reference voltage VR1, a second reference voltage VR2, a first initialization voltage VI1, a second initialization voltage VI2, a driving voltage VDD, and a low potential voltage VSS to supply a driving current to the light emitting element ED.

The pixel SP may include a pixel circuit and a light emitting element ED. The pixel circuit may include first to eighth transistors ST1 to ST8, a storage capacitor Cst, a hold capacitor Chold, and a parasitic capacitor Ced.

The sixth transistor ST6 may be turned on by the first emission signal EM to electrically connect a third node N3, which is the source electrode of the first transistor ST1, and a fourth node N4, which is the first electrode of the light emitting element ED. The gate electrode of the sixth transistor ST6 may receive the first emission signal EM, the drain electrode of the sixth transistor ST6 may be connected to the third node N3, and the source electrode of the sixth transistor ST6 may be connected to the fourth node N4.

Referring to FIG. 9 in conjunction with FIG. 8, in the case where the display device 10 is driven at a driving frequency (e.g., a set or predetermined driving frequency), one frame period may include one address section and multiple self sections. The address section may receive signals during first to seventh periods t1 to t7, and the self section may receive signals during the first, sixth, and seventh periods t1, t6, and t7.

Each of the fifth and sixth transistors ST5 and ST6 may receive the low level first emission signal EM[N] during the seventh period t7 of each of the address section and self period. The fifth transistor ST5 may be turned on based on the high level first emission signal EM[N] except for the seventh period t7, and the driving voltage VDD may be supplied to the second node N2, which is the drain electrode of the first transistor ST1. The sixth transistor ST6 may be turned on based on the high level first emission signal EM[N] except for the seventh period t7, and may electrically connect the third node N3 and the fourth node N4.

Accordingly, the number of stages of the emission control driver 620 can be reduced as the second emission signals EMB[N] of the display devices 10 of FIGS. 6 and 7 are omitted in the display devices 10 of FIGS. 8 and 9.

Figure 10:
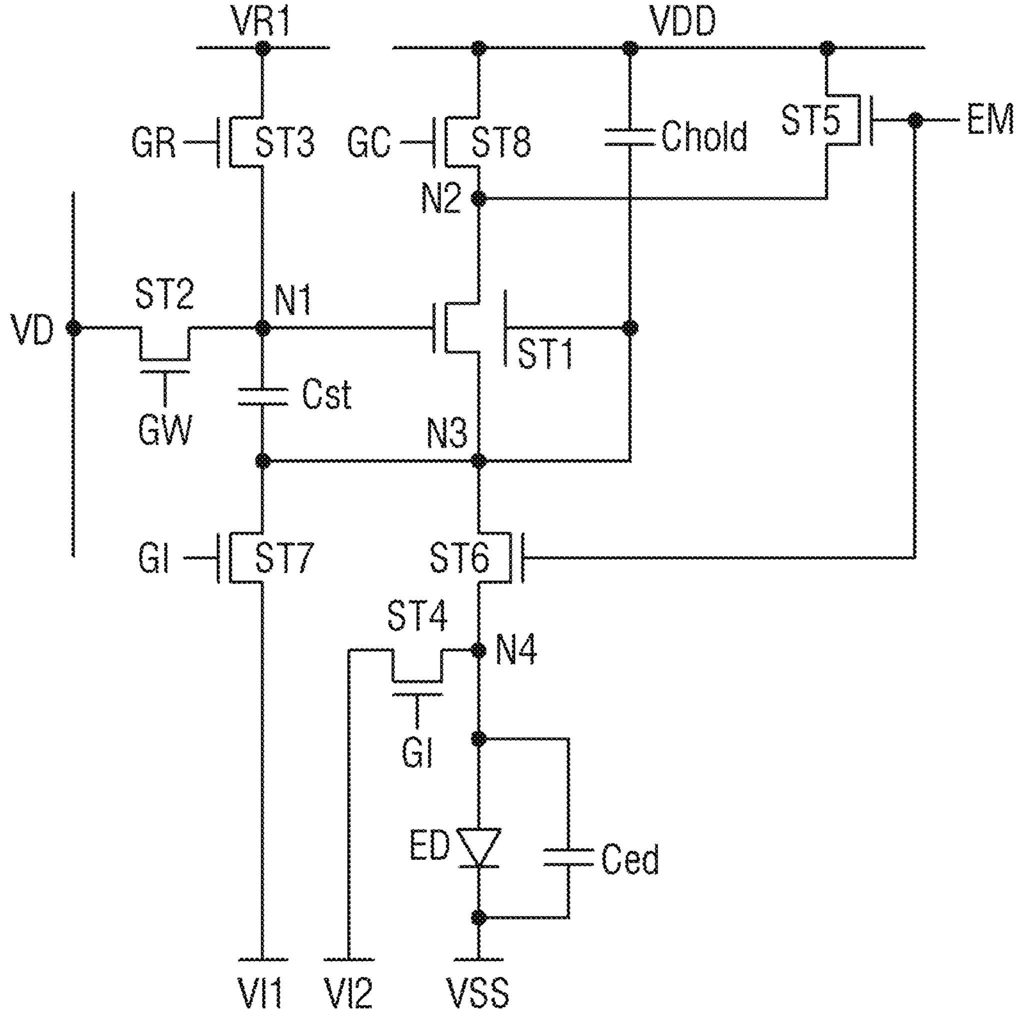
FIG. 10 is a circuit diagram illustrating a pixel of a display device according to some embodiments.

FIG. 10 is a circuit diagram illustrating a pixel of a display device according to some embodiments. The display device of FIG. 10 replaces the second reference voltage VR2 with the driving voltage VDD in the display device of FIG. 8, and the same configurations as the configurations described above will be briefly described or omitted.

Referring to FIG. 10, each of the plurality of pixels SP may receive a first gate signal GW, a second gate signal GR, a third gate signal GC, a fourth gate signal GI, a first emission signal EM, a data voltage VD, a first reference voltage VR1, a first initialization voltage VI1, a second initialization voltage VI2, a driving voltage VDD, and a low potential voltage VSS to supply a driving current to the light emitting element ED.

The pixel SP may include a pixel circuit and a light emitting element ED. The pixel circuit may include first to eighth transistors ST1 to ST8, a storage capacitor Cst, a hold capacitor Chold, and a parasitic capacitor Ced.

The eighth transistor ST8 may be turned on by the third gate signal GC to supply the driving voltage VDD to the second node N2, which is the drain electrode of the first transistor ST1. The gate electrode of the eighth transistor ST8 may receive the third gate signal GC, the drain electrode of the eighth transistor ST8 may receive the driving voltage VDD, and the source electrode of the eighth transistor ST8 may be connected to the second node N2.

The hold capacitor Chold may be electrically connected between the driving voltage line supplying the driving voltage VDD and the third node N3. The first capacitor electrode of the hold capacitor Chold may receive the driving voltage VDD, and the second capacitor electrode of the hold capacitor Chold may be connected to the third node N3. Accordingly, the hold capacitor Chold can maintain the potential difference between the driving voltage VDD and the source electrode of the first transistor ST1.

Accordingly, the number of voltage lines can be reduced as the second reference voltage VR2 of the display device 10 of FIG. 8 is omitted in the display device 10 of FIG. 10.

Figure 11:
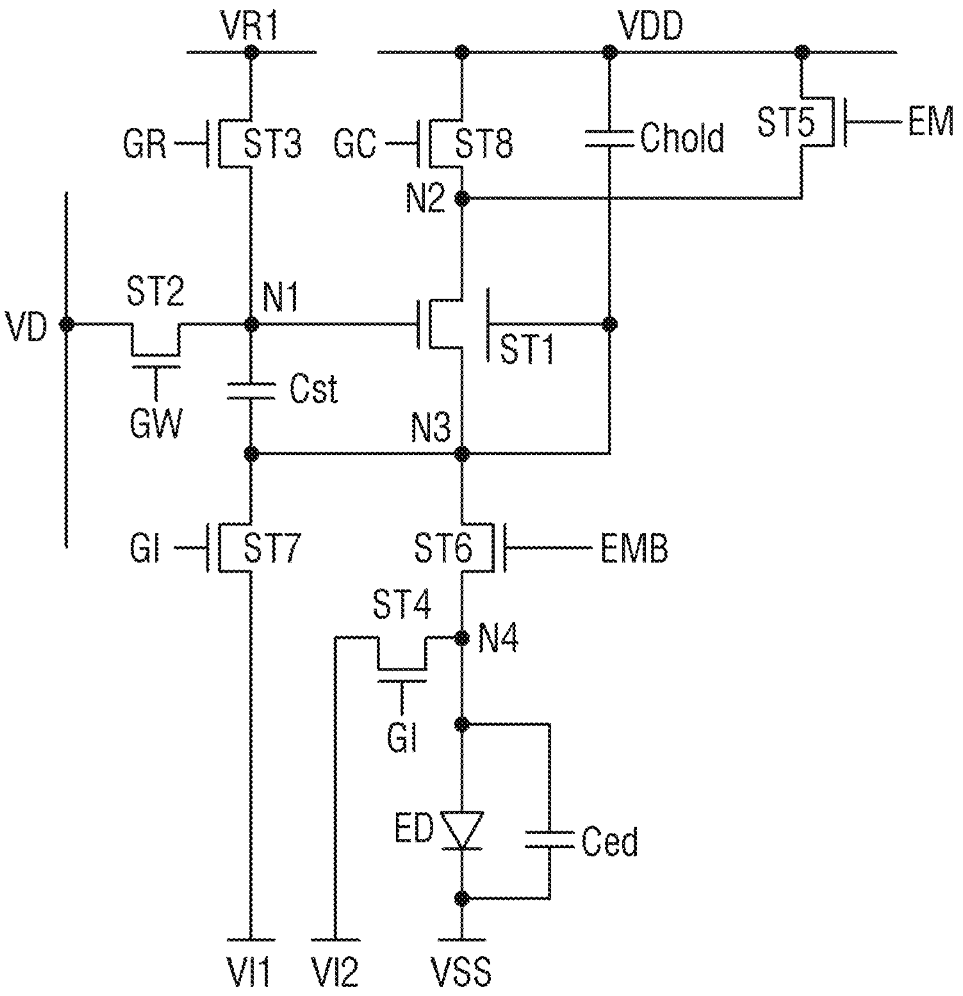
FIG. 11 is a circuit diagram illustrating a pixel of a display device according to some embodiments.

FIG. 11 is a circuit diagram illustrating a pixel of a display device according to some embodiments. The display device of FIG. 11 replaces the second reference voltage VR2 with the driving voltage VDD in the display device of FIG. 6, and the same configurations as the configurations described above will be briefly described or omitted.

Referring to FIG. 11, each of the plurality of pixels SP may receive a first gate signal GW, a second gate signal GR, a third gate signal GC, a fourth gate signal GI, a first emission signal EM, a second emission signal EMB, a data voltage VD, a first reference voltage VR1, a first initialization voltage VI1, a second initialization voltage VI2, a driving voltage VDD, and a low potential voltage VSS to supply a driving current to the light emitting element ED.

The pixel SP may include a pixel circuit and a light emitting element ED. The pixel circuit may include first to eighth transistors ST1 to ST8, a storage capacitor Cst, a hold capacitor Chold, and a parasitic capacitor Ced.

The sixth transistor ST6 may be turned on by the second emission signal EMB, and the third node N3, which is the source electrode of the first transistor ST1, and the fourth node N4, which is the first electrode of the light emitting element ED, may be electrically connected. The gate electrode of the sixth transistor ST6 may receive the second emission signal EMB, the drain electrode of the sixth transistor ST6 may be connected to the third node N3, and the source electrode of the sixth transistor ST6 may be connected to the fourth node N4.

The eighth transistor ST8 may be turned on by the third gate signal GC to supply the driving voltage VDD to the second node N2, which is the drain electrode of the first transistor ST1. The gate electrode of the eighth transistor ST8 may receive the third gate signal GC, the drain electrode of the eighth transistor ST8 may receive the driving voltage VDD, and the source electrode of the eighth transistor ST8 may be connected to the second node N2.

The hold capacitor Chold may be electrically connected between the driving voltage line supplying the driving voltage VDD and the third node N3. The first capacitor electrode of the hold capacitor Chold may receive the driving voltage VDD, and the second capacitor electrode of the hold capacitor Chold may be connected to the third node N3. Accordingly, the hold capacitor Chold can maintain the potential difference between the driving voltage VDD and the source electrode of the first transistor ST1.

Accordingly, the number of voltage lines can be reduced as the second reference voltage VR2 of the display device 10 of FIG. 6 is omitted in the display device 10 of FIG. 11.

Figure 12:
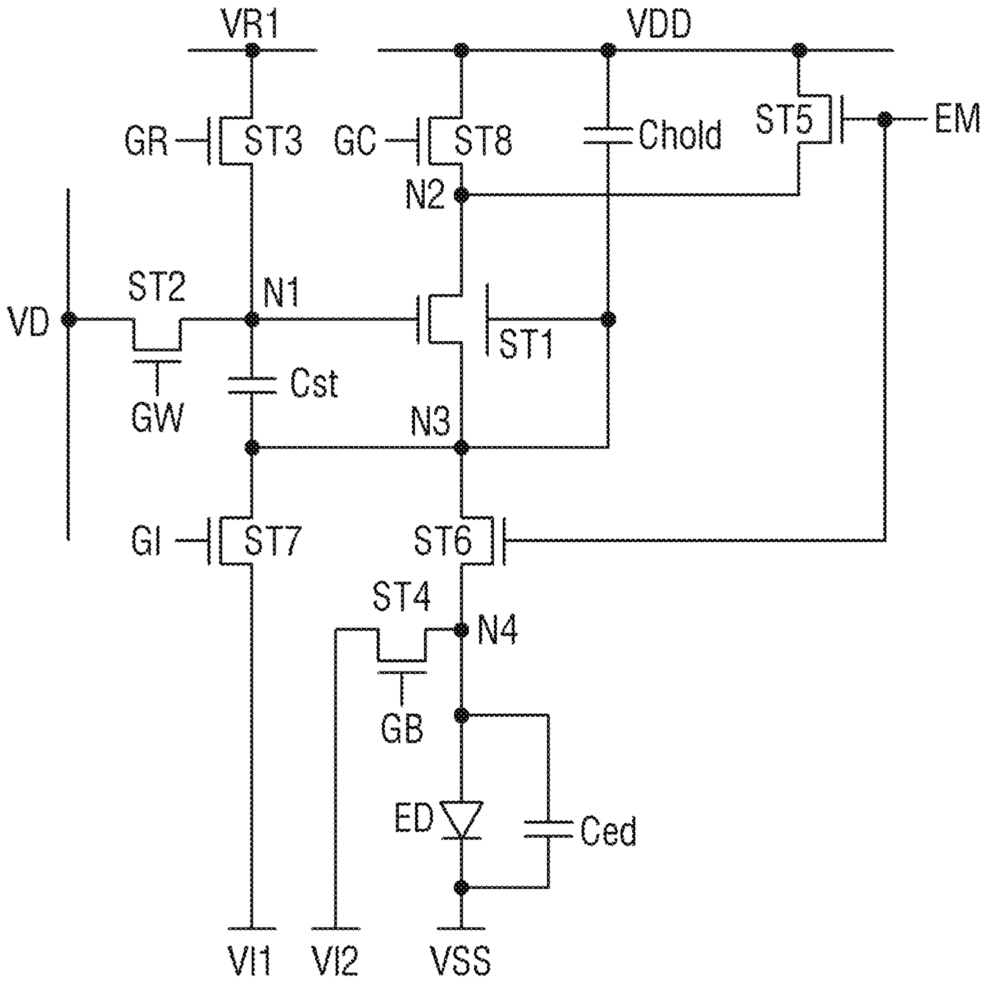
FIG. 12 is a circuit diagram illustrating a pixel of a display device according to some embodiments.
Figure 13:
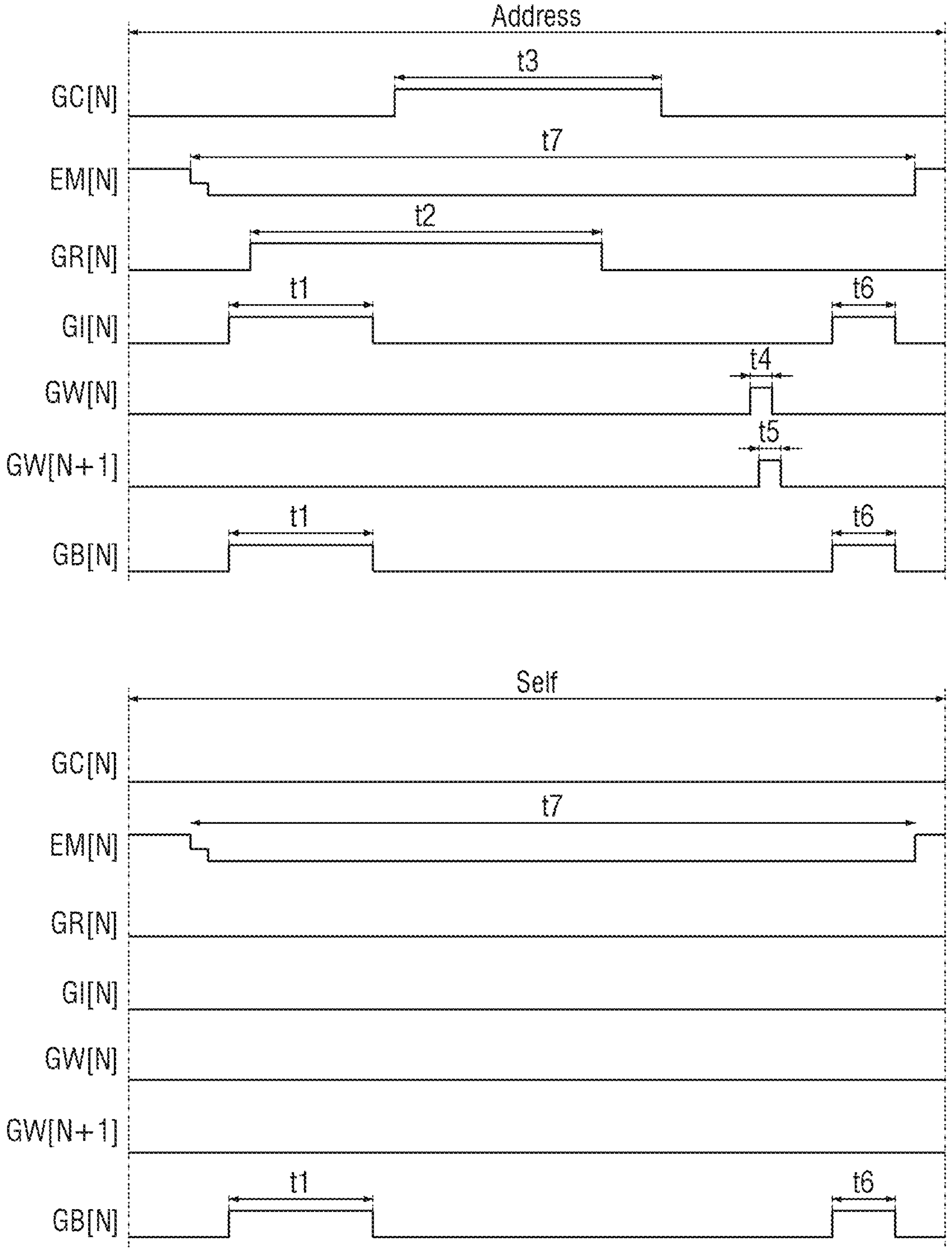
FIG. 13 is a waveform diagram of signals supplied to the pixel shown in FIG. 12.

FIG. 12 is a circuit diagram showing a pixel of a display device according to some embodiments, and FIG. 13 is a waveform diagram of signals supplied to the pixel shown in FIG. 12. The display device of FIGS. 12 and 13 replaces the fourth gate signal GI applied to the fourth transistor ST4 with a fifth gate signal GB in the display device of FIG. 10, and the same configurations as the configurations described above will be briefly described or omitted.

Referring to FIGS. 12 and 13, each of the plurality of pixels SP may receive a first gate signal GW, a second gate signal GR, a third gate signal GC, a fourth gate signal GI, a fifth gate signal GB, a first emission signal EM, a data voltage VD, a first reference voltage VR1, a first initialization voltage VI1, a second initialization voltage VI2, a driving voltage VDD, and a low potential voltage VSS to supply a driving current to the light emitting element ED.

The pixel SP may include a pixel circuit and a light emitting element ED. The pixel circuit may include first to eighth transistors ST1 to ST8, a storage capacitor Cst, a hold capacitor Chold, and a parasitic capacitor Ced.

The fourth transistor ST4 may be turned on by the fifth gate signal GB to discharge the first electrode of the light emitting element ED to the second initialization voltage VI2. The gate electrode of the fourth transistor ST4 may receive the fifth gate signal GB, the drain electrode of the fourth transistor ST4 may be connected to the fourth node N4, which is the first electrode of the light emitting element ED, and the source electrode of the fourth transistor ST4 may receive the second initialization voltage VI2.

The eighth transistor ST8 may be turned on by the third gate signal GC to supply the driving voltage VDD to the second node N2, which is the drain electrode of the first transistor ST1. The gate electrode of the eighth transistor ST8 may receive the third gate signal GC, the drain electrode of the eighth transistor ST8 may receive the driving voltage VDD, and the source electrode of the eighth transistor ST8 may be connected to the second node N2.

The hold capacitor Chold may be electrically connected between the driving voltage line supplying the driving voltage VDD and the third node N3. The first capacitor electrode of the hold capacitor Chold may receive the driving voltage VDD, and the second capacitor electrode of the hold capacitor Chold may be connected to the third node N3. Accordingly, the hold capacitor Chold can maintain the potential difference between the driving voltage VDD and the source electrode of the first transistor ST1.

Referring to FIG. 13 in conjunction with FIG. 12, in the case where the display device 10 is driven at a driving frequency (e.g., a set or predetermined driving frequency), one frame period may include one address section and multiple self sections. The address section may receive signals during first to seventh periods t1 to t7, and the self section may receive signals during the first, sixth, and seventh periods t1, t6, and t7.

The fourth transistor ST4 may receive a high level fifth gate signal GB[N] during the first period t1 and the sixth period t6 of each of the address section and the self section. The fourth transistor ST4 may be turned on based on the high level fifth gate signal GB[N] and may discharge the first electrode of the light emitting element ED to the second initialization voltage VI2.

The seventh transistor ST7 may receive a high level fourth gate signal GI[N] during the first period t1 and the sixth period t6 of the address section. The seventh transistor ST7 may be turned on based on the high level fourth gate signal GI[N], and the source electrode of the first transistor ST1 may be discharged to the first initialization voltage VI1. The seventh transistor ST7 may be turned off during the self section.

Accordingly, since the display devices 10 of FIGS. 12 and 13 may supply the fifth gate signal GB[N] to the fourth transistor ST4 and the fourth gate signal GI[N] to the seventh transistor ST7, the source electrode of the first transistor ST1 may be initialized to the first initialization voltage VI1 only in the address section, and the first electrode of the light emitting element ED may be initialized to the second initialization voltage VI2 during the address section and the self section.

Figure 14:
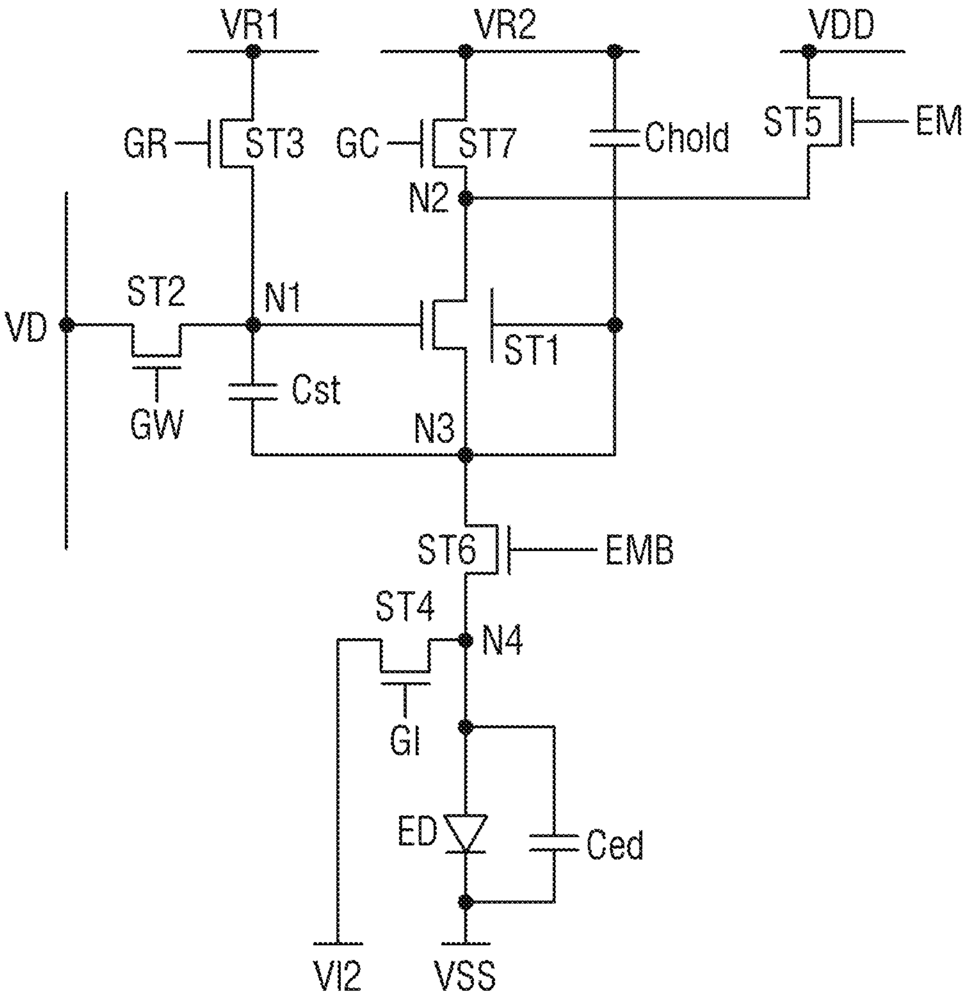
FIG. 14 is a circuit diagram illustrating a pixel of a display device according to some embodiments.
Figure 15:
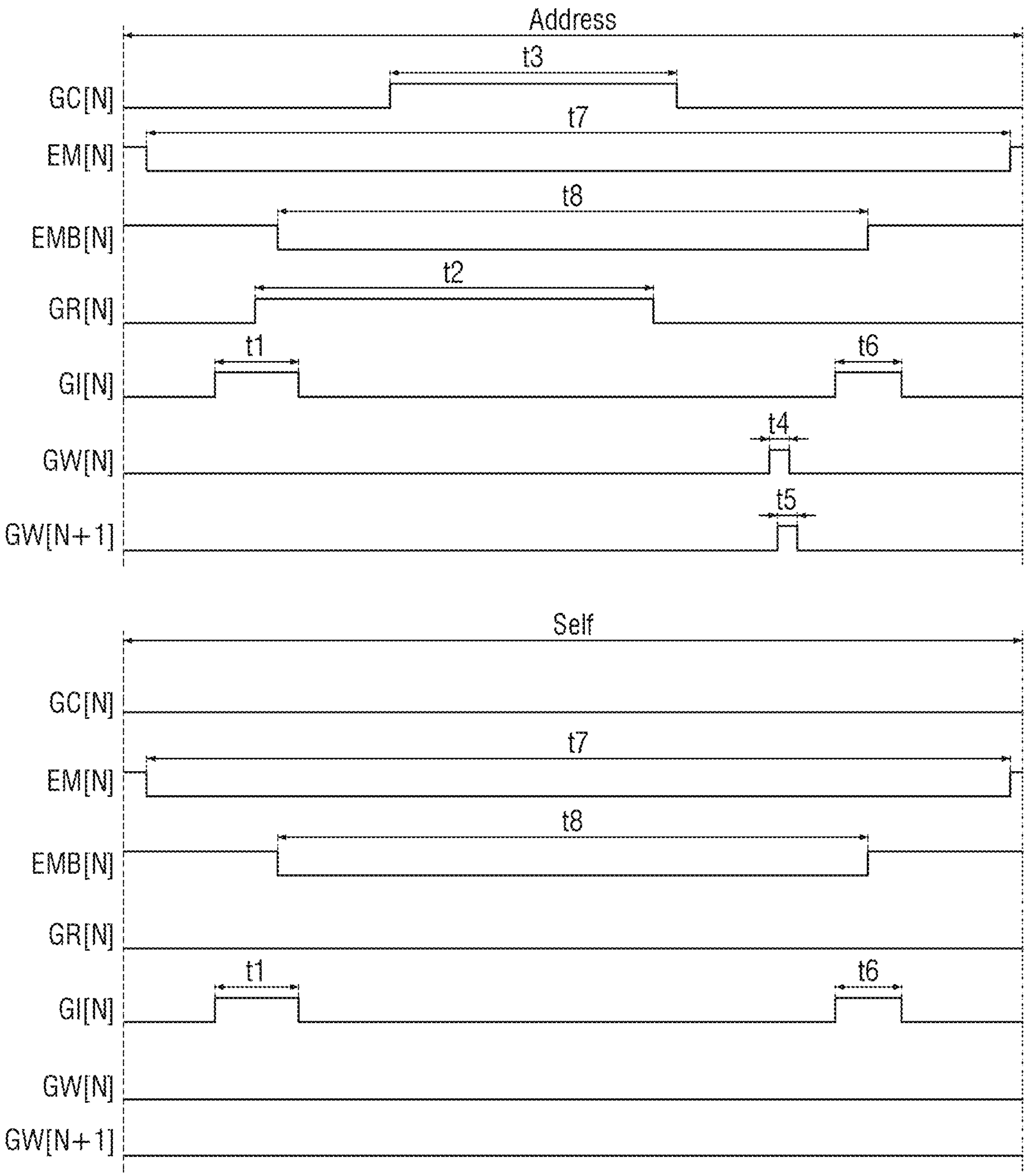
FIG. 15 is a waveform diagram of signals supplied to the pixel shown in FIG. 14.

FIG. 14 is a circuit diagram illustrating a pixel of a display device according to some embodiments, and FIG. 15 is a waveform diagram of signals supplied to the pixel shown in FIG. 14. The display device of FIG. 14 omits the seventh transistors ST7 in the display devices of FIGS. 6 and 7, and the same configurations as the configurations described above will be briefly described or omitted.

Referring to FIG. 14, each of the plurality of pixels SP may receive a first gate signal GW, a second gate signal GR, a third gate signal GC, a fourth gate signal GI, a first emission signal EM, a second emission signal EMB, a data voltage VD, a first reference voltage VR1, a second reference voltage VR2, a second initialization voltage VI2, a driving voltage VDD, and a low potential voltage VSS to supply a driving current to the light emitting element ED.

The pixel SP may include a pixel circuit and a light emitting element ED. The pixel circuit may include first to seventh transistors ST1 to ST7, a storage capacitor Cst, a hold capacitor Chold, and a parasitic capacitor Ced.

The seventh transistor ST7 may be turned on by the third gate signal GC to supply the second reference voltage VR2 to the second node N2, which is the drain electrode of the first transistor ST1. The gate electrode of the seventh transistor ST7 may receive the third gate signal GC, the drain electrode of the seventh transistor ST7 may receive the second reference voltage VR2, and the source electrode of the seventh transistor ST7 may be connected to the second node N2. The second reference voltage VR2 may be different from the first reference voltage VR1 and may be a constant voltage without a ripple. The second reference voltage VR2 may be smaller than the driving voltage VDD and greater than the low potential voltage VSS. The second reference voltage VR2 may not be supplied to other transistors and other capacitors except the seventh transistor ST7 and the hold capacitor Chold.

Referring to FIG. 15 in conjunction with FIG. 14, in the case where the display device 10 is driven at a driving frequency (e.g., a set or predetermined driving frequency), one frame period may include one address section and multiple self sections. The address section may receive signals during the first to eighth periods t1 to t8, and the self section may receive signals during the first period t1, and sixth to and eighth periods t6 to t8.

The fourth transistor ST4 may receive a high level fourth gate signal GI[N] during the first period t1 and the sixth period t6 of each of the address section and the self section. The fourth transistor ST4 may be turned on based on the high level fourth gate signal GI[N] and may discharge the first electrode of the light emitting element ED to the second initialization voltage VI2.

The seventh transistor ST7 may receive the high level third gate signal GC[N] during the third period t3 of the address section. The seventh transistor ST7 may be turned on based on the high level third gate signal GC[N], and the second reference voltage VR2 may be supplied to the second node N2, which is the drain electrode of the first transistor ST1. The seventh transistor ST7 may be turned off during the self section. Accordingly, the seventh transistor ST7 may be turned on once during one frame period to supply the second reference voltage VR2 to the drain electrode of the first transistor ST1. The seventh transistor ST7 is turned off during the self section, thereby preventing or reducing cycle mura or horizontal line defects that may occur during the self section.

The third gate signal GC[N] may be received from the stage STG of FIG. 5. Accordingly, the third gate signal GC[N] may be converted from the high level to the low level without passing through the middle level, and the seventh transistor ST7 may be turned on during the third period t3 to improve distribution of the threshold voltage.

Figure 16:
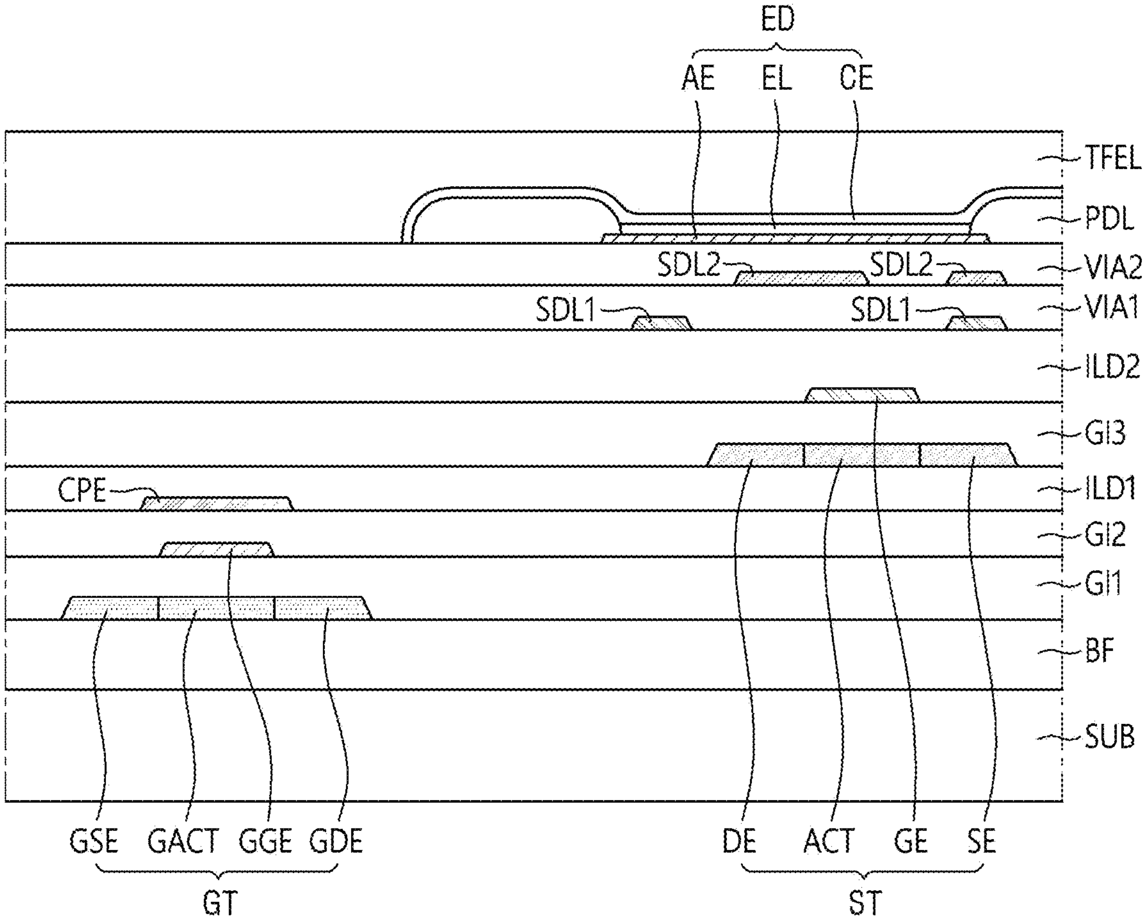
FIG. 16 is a cross-sectional view of a display panel of a display device according to some embodiments.

FIG. 16 is a cross-sectional view showing a display panel of a display device according to some embodiments.

Referring to FIG. 16, the display panel 100 may include a substrate SUB, a buffer layer BF, a first active layer ACTL1, a first gate insulating layer GI1, a first gate layer GTL1, a second gate insulating layer GI2, second gate layer GTL2, a first interlayer insulating layer ILD1, a second active layer ACTL2, a third gate insulating layer GI3, a third gate layer GTL3, a second interlayer insulating layer ILD2, a first source metal layer SDL1, a first via layer VIA1, a second source metal layer SDL2, a second via layer VIA2, a pixel defining layer PDL, light emitting element ED, and an encapsulation layer TFEL.

The substrate SUB may be a base substrate or a base member. The substrate SUB may be a flexible substrate which can be bent, folded or rolled. For example, the substrate SUB may include a polymer resin such as polyimide (PI), but is not limited thereto. For another example, the substrate SUB may include a glass material or a metal material.

The buffer layer BF may be located on the substrate SUB. For example, the buffer layer BF may include an inorganic layer capable of preventing or reducing permeation of air or moisture. For example, the buffer layer BF may include a plurality of inorganic layers that are alternately stacked.

The first active layer ACTL1 may be located on the buffer layer BF. The first active layer ACTL1 may include a silicon-based material. For example, the first active layer ACTL1 may be made of low-temperature polycrystalline silicon (LTPS). The first active layer ACTL1 may include a semiconductor region GACT, a source electrode GSE, and a drain electrode GDE of a gate transistor GT. The gate transistor GT may form the stage STG of FIG. 5. The gate transistor GT may be one of the plurality of gate transistors shown in FIG. 5.

The first gate insulating layer GI1 may be located on the first active layer ACTL1. The first gate insulating layer GI1 may insulate the first active layer ACTL1 from the first gate layer GTL1.

The first gate layer GTL1 may be located on the first gate insulating layer GI1. The first gate layer GTL1 may include a gate electrode GGE of the gate transistor GT.

The second gate insulating layer GI2 may be located on the first gate layer GTL1. The second gate insulating layer GI2 may insulate the first gate layer GTL1 from the second gate layer GTL2.

The second gate layer GTL2 may be located on the second gate insulating layer GI2. The second gate layer GTL2 may include a capacitor electrode CPE.

The first interlayer insulating layer ILD1 may be located on the second gate layer GTL2. The first interlayer insulating layer ILD1 may insulate the second gate layer GTL2 from a second active layer ACTL2.

The second active layer ACTL2 may be located on the first interlayer insulating layer ILD1. The second active layer ACTL2 may include an oxide-based material. The second active layer ACTL2 may include a semiconductor region ACT, a drain electrode DE, and a source electrode SE of a transistor ST. The transistor ST may form the pixels SP of FIGS. 6, 8, 10 to 12, and 14. The transistor ST may be one of a plurality of transistors shown in FIGS. 6, 8, 10 to 12, and 14.

The third gate insulating layer GI3 may be located on the second active layer ACTL2. The third gate insulating layer GI3 may insulate the second active layer ACTL2 from the third gate layer GTL3.

The third gate layer GTL3 may be located on the third gate insulating layer GI3. The third gate layer GTL3 may include the gate electrode GE of the transistor ST.

The second interlayer insulating layer ILD2 may be located on the third gate layer GTL3. The second interlayer insulating layer ILD2 may insulate the third gate layer GTL3 from the first source metal layer SDL1.

The first source metal layer SDL1 may be located on the second interlayer insulating layer ILD2.

The first via layer VIA1 may be located on the first source metal layer SDL1. The first via layer VIA1 may insulate the first source metal layer SDL1 from the second source metal layer SDL2.

The second source metal layer SDL2 may be located on the first via layer VIA1.

The second via layer VIA2 may be located on the second source metal layer SDL2.

Some among a data line DL supplying the data voltage VD, a first reference voltage line supplying the first reference voltage VR1, a second reference voltage line supplying the second reference voltage VR2, a first initialization voltage line supplying the first initialization voltage VI1, a second initialization voltage line supplying the second initialization voltage VI2, and a driving voltage line supplying the driving voltage VDD are connected to the first source metal layer SDL1, and the other part thereof may be located on the second source metal layer SDL2. The data voltage VD, the first reference voltage VR1, the second reference voltage VR2, the first initialization voltage VI1, the second initialization voltage VI2, and the driving voltage VDD are different voltages and are applied to the pixel SP.

The pixel defining layer PDL may be located on the second via layer VIA2. The pixel defining layer PDL may define an emission area or an opening area. The pixel defining layer PDL may include an organic insulating material such as polyimide PI.

The light emitting element ED may include a pixel electrode AE, a light emitting layer EL, and a common electrode CE. The pixel electrode AE may be located on the second via layer VIA2. The pixel electrode AE may overlap the emission area defined by the pixel defining layer PDL. The pixel electrode AE may receive a driving current from the pixel circuit of the pixel SP.

The light emitting layer EL may be located on the pixel electrode AE. For example, the light emitting layer EL may be an organic light emitting layer made of an organic material, but is not limited thereto. In the case of employing the organic light emitting layer as the light emitting layer EL, the pixel circuit of the pixel SP applies a voltage (e.g., a set or predetermined voltage) to the pixel electrode AE, and if the common electrode CE receives a common voltage or a cathode voltage, the holes and electrons can move to the organic light emitting layer EL through the hole transporting layer and the electron transporting layer and combine to produce light to be emitted by the organic light emitting layer EL.

The common electrode CE may be arranged on the light emitting layer EL. For example, the common electrode CE may be made in the form of an electrode common to all of the pixels SP rather than specific to each of the pixels SP. The common electrode CE may be located on the light emitting layer EL in the plurality of emission areas and may be located on the pixel defining layer PDL in an area other than the plurality of emission areas.

The encapsulation layer TFEL may be located on the common electrode CE to cover the plurality of light emitting elements ED. The encapsulation layer TFEL may include at least one inorganic layer to prevent or reduce instances of oxygen, moisture, or other contaminants penetrating into the plurality of light emitting elements ED. The encapsulation layer TFEL may include at least one organic layer to protect the plurality of light emitting elements ED from foreign matters such as dust.

What is claimed is:

1. A display device comprising:

a light emitting element on a substrate;

a first transistor configured to control a driving current flowing in the light emitting element;

a second transistor configured to supply a data voltage to a gate electrode of the first transistor based on a first gate signal;

a third transistor configured to supply a first reference voltage to the gate electrode of the first transistor based on a second gate signal;

a fourth transistor configured to supply a second reference voltage different from the first reference voltage to a drain electrode of the first transistor based on a third gate signal;

a fifth transistor configured to supply a driving voltage to the drain electrode of the first transistor based on a first emission signal; and a hold capacitor connected between a second reference line supplying the second reference voltage and a source electrode of the first transistor, and wherein one electrode of the fourth transistor is connected to one electrode of the fifth transistor, and wherein the one electrode of the fourth transistor and one electrode of the hold capacitor are connected to different electrodes of the first transistor.

2. The display device of claim 1, further comprising:

a sixth transistor configured to electrically connect the source electrode of the first transistor and a first electrode of the light emitting element based on a second emission signal;

a seventh transistor configured to discharge the source electrode of the first transistor to a first initialization voltage based on a fourth gate signal; and an eighth transistor configured to discharge a first electrode of the first transistor to a second initialization voltage based on the fourth gate signal.

3. The display device of claim 2, wherein one frame period is defined as comprising one address section and multiple self sections, wherein the third transistor is configured to be turned on by receiving the second gate signal during a first period of the address section and turned off during the multiple self sections, and wherein the fourth transistor is configured to be turned on by receiving the third gate signal during a second period of the address section and turned off during the multiple self sections.

4. The display device of claim 3, wherein each of the third and fourth transistors is configured to be turned on during the address section in which the fifth transistor and the sixth transistor are turned off.

5. The display device of claim 3, wherein the fifth transistor is configured to be turned on by receiving the first emission signal during the address section and a self section of the multiple self sections, and wherein the sixth transistor is configured to be turned on by receiving the second emission signal during the address section and the self section.

6. The display device of claim 1, further comprising:

a sixth transistor electrically connecting the source electrode of the first transistor and a first electrode of the light emitting element based on the first emission signal;

a seventh transistor configured to discharge the source electrode of the first transistor to a first initialization voltage based on a fourth gate signal; and an eighth transistor configured to discharge the first electrode of the light emitting element to a second initialization voltage based on the fourth gate signal.

7. The display device of claim 6, wherein one frame period is defined as comprising one address section and multiple self sections, wherein the third transistor is configured to be turned on by receiving the second gate signal during a first period of the address section and configured to be turned off during the multiple self sections, wherein the fourth transistor is configured to be turned on by receiving the third gate signal during a second period of the address section and configured to be turned off during the multiple self sections; and wherein the fifth and sixth transistors are configured to be turned on by receiving the first emission signal during the address section and the self section.

8. The display device of claim 1, wherein the first transistor further comprises a bias electrode connected to the source electrode of the first transistor and the hold capacitor.

9. The display device of claim 1, wherein each of the first to fourth transistors comprises an oxide-based active layer.

10. A display device comprising:

a light emitting element on a substrate;

a first transistor configured to control a driving current flowing in the light emitting element;

a second transistor configured to supply a data voltage to a gate electrode of the first transistor based on a first gate signal;

a third transistor configured to supply a first reference voltage to the gate electrode of the first transistor based on a second gate signal;

a fourth transistor configured to supply a driving voltage to a drain electrode of the first transistor based on a third gate signal;

a fifth transistor configured to supply the driving voltage to the drain electrode of the first transistor based on a first emission signal; and a hold capacitor connected between a driving voltage line configured to supply the driving voltage and a source electrode of the first transistor, and wherein one electrode of the fourth transistor is connected to one electrode of the fifth transistor, and wherein the one electrode of the fourth transistor and one electrode of the hold capacitor are connected to different electrodes of the first transistor.

11. The display device of claim 10, further comprising:

a sixth transistor configured to electrically connect the source electrode of the first transistor and a first electrode of the light emitting element based on the first emission signal;

a seventh transistor configured to discharge the source electrode of the first transistor to a first initialization voltage based on a fourth gate signal; and an eighth transistor configured to discharge the first electrode of the light emitting element to a second initialization voltage based on the fourth gate signal.

12. The display device of claim 11, wherein one frame period is defined as comprising one address section and multiple self sections, wherein the third transistor is configured to be turned on by receiving the second gate signal during a first period of the address section and configured to be turned off during the multiple self sections, and wherein the fourth transistor is configured to be turned on by receiving the third gate signal during a second period of the address section and configured to be turned off during the multiple self sections.

13. The display device of claim 10, further comprising:

a sixth transistor configured to electrically connect the source electrode of the first transistor and a first transistor of the light emitting element based on a second emission signal;

a seventh transistor configured to discharge the source electrode of the first transistor to a first initialization voltage based on a fourth gate signal; and an eighth transistor configured to discharge a first electrode of the light emitting element to a second initialization voltage based on the fourth gate signal.

14. The display device of claim 10, further comprising:

a sixth transistor configured to electrically connect the source electrode of the first transistor and a first electrode of the light emitting element based on the first emission signal;

a seventh transistor configured to discharge the source electrode of the first transistor to a first initialization voltage based on a fourth gate signal; and an eighth transistor configured to discharge the first electrode of the light emitting element to a second initialization voltage based on a fifth gate signal.

15. The display device of claim 14, wherein one frame period is defined as comprising one address section and multiple self sections, wherein the third transistor is configured to be turned on by receiving the second gate signal during a first period of the address section and configured to be turned off during the multiple self sections, and wherein the fourth transistor is configured to be turned on by receiving the third gate signal during a second period of the address section and configured to be turned off during the multiple self sections.

16. The display device of claim 15, wherein the seventh transistor is configured to be turned on by receiving the fourth gate signal during the address section and configured to be turned off during the multiple self sections, and wherein the eighth transistor is configured to be turned on by receiving the fifth gate signal during the address section and the self section.

17. The display device of claim 10, further comprising:

a sixth transistor configured to electrically connect the source electrode of the first transistor and a first electrode of the light emitting element based on a second emission signal; and a seventh transistor configured to discharge the first electrode of the light emitting element to an initialization voltage based on a fourth gate signal.

18. A display device comprising:

a display area comprising a pixel; and a non-display area comprising a stage configured to supply a gate signal to the pixel, wherein the stage comprises a plurality of gate transistors including a silicon-based active layer configured to generate the gate signal, wherein the pixel comprises:

a light emitting element on a substrate;

a first transistor configured to control a driving current flowing in the light emitting element;

a second transistor configured to supply a data voltage to a gate electrode of the first transistor based on a first gate signal;

a third transistor configured to supply a first reference voltage to the gate electrode of the first transistor based on a second gate signal;

a fourth transistor configured to supply a second reference voltage different from the first reference voltage to a drain electrode of the first transistor based on a third gate signal;

a fifth transistor configured to supply a driving voltage to the drain electrode of the first transistor based on a first emission signal; and a hold capacitor connected between a second reference line configured to supply the second reference voltage and a source electrode of the first transistor, wherein the first to fifth transistors include an oxide-based active layer, and wherein one electrode of the fourth transistor is connected to one electrode of the fifth transistor, and wherein the one electrode of the fourth transistor and one electrode of the hold capacitor are connected to different electrodes of the first transistor.

19. The display device of claim 18, wherein one frame period is defined as comprising one address section and multiple self sections, wherein the third transistor is configured to be turned on by receiving the second gate signal during a first period of the address section and configured to be turned off during the multiple self sections, and wherein the fourth transistor is turned on by receiving the third gate signal during a second period of the address section and turned off during the multiple self sections.

20. The display device of claim 19, wherein the second transistor is configured to be turned on by receiving the first gate signal during a third period of the address section and configured to be turned off during the multiple self sections.

* * * * *